United States Patent [19]

Brands

[11] Patent Number: 5,696,827
[45] Date of Patent: Dec. 9, 1997

[54] SECURE CRYPTOGRAPHIC METHODS FOR ELECTRONIC TRANSFER OF INFORMATION

[76] Inventor: Stefanus Alfonsus Brands, Ina Boudier-Bakkerlaan 143 (iii), XW Utrecht, Netherlands, 3582

[21] Appl. No.: 792,817

[22] Filed: Jan. 30, 1997

Related U.S. Application Data

[60] Division of Ser. No. 521,768, Aug. 31, 1995, which is a continuation-in-part of Ser. No. 203,231, Feb. 28, 1994, Pat. No. 5,521,980.

[51] Int. Cl.$^6$ .................................................. H04L 9/30
[52] U.S. Cl. .................................................. 380/30; 380/21
[58] Field of Search ........................................ 380/21, 30

[56] References Cited

U.S. PATENT DOCUMENTS

| | | | |
|---|---|---|---|
| Re. 34,954 | 5/1995 | Haber et al. | 380/30 |
| 4,458,109 | 7/1984 | Mueller-Schloer | 380/30 |
| 4,529,870 | 7/1985 | Chaum | 380/30 |
| 4,759,063 | 7/1988 | Chaum | 380/30 |
| 4,759,064 | 7/1988 | Chaum | 380/30 |
| 4,868,877 | 9/1989 | Fischer | 380/30 |
| 4,876,716 | 10/1989 | Okamoto | 380/30 |
| 4,914,698 | 4/1990 | Chaum | 380/30 |
| 4,926,480 | 5/1990 | Chaum | 380/30 |
| 4,949,380 | 8/1990 | Chaum | 380/30 |
| 4,996,711 | 2/1991 | Chaum | 380/30 |
| 5,005,200 | 4/1991 | Fischer | 380/30 |
| 5,029,208 | 7/1991 | Tanaka | 380/30 |
| 5,150,411 | 9/1992 | Maurer | 380/30 |
| 5,164,988 | 11/1992 | Matyas et al. | 380/30 |
| 5,214,702 | 5/1993 | Fischer | 380/30 |
| 5,251,258 | 10/1993 | Tanaka | 380/30 |
| 5,276,736 | 1/1994 | Chaum | 380/30 |
| 5,337,360 | 8/1994 | Fischer | 380/30 |
| 5,418,854 | 5/1995 | Kaufman et al. | 380/30 |
| 5,422,953 | 6/1995 | Fischer | 380/30 |
| 5,442,707 | 8/1995 | Miyaji et al. | 380/30 |
| 5,475,753 | 12/1995 | Barbara et al. | 380/30 |
| 5,483,597 | 1/1996 | Stern | 380/30 |
| 5,521,980 | 5/1996 | Brands | 380/30 |
| 5,604,801 | 2/1997 | Dolan et al. | 380/21 |
| 5,606,617 | 2/1997 | Brands | 380/30 |

OTHER PUBLICATIONS

Fiat, A. and Shamir, A., "How to prove yourself: practical solutions to identification and signature problems," Crypto '86, Springer–Verlag (1987), pp. 186–194.

Schnorr, C., "Efficient Signature Generation by Smart Cards," Journal of Cryptology, vol. 4, No. 3 (1991), pp. 161–174.

ElGamal, T., "A public key cryptosystem and a signature scheme based on discrete logarithms," IEEE Transactions on Information Theory, vol. IT-31, No. 4, Jul. 1985, pp. 469–472.

Okamoto, T., "Provably Secure and Practical Identification Schemes and Corresponding Signature Schemes," Crypto '92, Lecture Notes in Computer Science 740, Springer–Verlag (1993), pp. 31–53.

(List continued on next page.)

*Primary Examiner*—Salvatore Cangialosi
*Attorney, Agent, or Firm*—Pennie & Edmonds LLP

[57] ABSTRACT

Cryptographic methods and apparatus are disclosed relating to practical cryptographic systems for electronic transfer of information. Specifically, inventive techniques are described to allow the use of tamper-resistant computing devices without powerful processors; to guarantee security against criminals able to gain full control over computing devices of other parties; to allow value in privacy-protected off-line cash systems to be represented by counters instead of digital coins, without significantly compromising security against criminals who can by-pass tamper-resistance; and to allow secure currency conversion in privacy-protected off-line cash systems, without requiring tamper-resistance for receiver parties.

4 Claims, 12 Drawing Sheets

OTHER PUBLICATIONS

Brickell, E. and McCurley, K., "An interactive identification scheme based on discrete logarithms and factoring," Journal of Cryptology, vol. 5, No. 1 (1992), pp. 29–39.

NIST, "Specifications for a digital signature standard (DSS)," Federal Information Processing Standards Pub. (draft), May 19, 1994.

R. Rivest, A. Shamir and L. Adleman, "A method for obtaining digital signatures and public–key cryptosystems," Communications of the ACM, Feb. 1978, pp. 120–126.

Guillou, L. and Quisquater, J., "A practical zero–knowledge protocol fitted to security microprocessor minimizing both transmission and memory," Lecture Notes in Computer Science 330, Proceedings of Eurocrypt '88, Springer–Verlag (1989), pp. 123–128.

Feige, U., Fiat, A. and Shamir, A., "Zero–knowledge proofs of identity," Journal of Cryptology 1 (1988), pp. 77–94.

Naccache, D., M'Raïhi, D., Raphaeli, D., and Vaudenay, S., "Can D.S.A. be Improved!—Complexity Trade–Offs with the Digital Signature Standard–," Pre–proceedings of Eurocrypt 1994, pp. 85–94.

Bos, J., and Chaum, D., "SmartCash: A Practical Electronic Payment System," Centrum voor Wiskunde en Informatica Report CS–R9035, Aug. 1990.

Accredited Standards Committee X9, "Working Draft: American National Standards Committee X9.30"–1993.

"Public Key Cryptography Using Irreversible Algorithms for the Financial Services Industry: Part 2: The Secure Hash Algorithm (SHA)," 1993).

Cramer, R. and Pedersen, T., "Improved Privacy in Wallets with Observers," Advances in Cryptology—Eurocrypt 1993, Lecture Notes in Computer Science, No. 765, Springer–Valag, pp. 329–342.

Feige, U., and Shamir, A., "Witness Indistinguishable and Witness Hiding Protocols," Proceedings of the 22nd Annual ACM Symposium on the Theory of Computing, 1990, pp. 416–426.

SECURE CRYPTOGRAPHIC METHODS FOR ELECTRONIC TRANSFER OF INFORMATION

This is a division of application Ser. No. 08/521,768, pending, filed Aug. 31, 1995, which was a continuation-in-part of U.S. Ser. No. 08/203,231, filed Feb. 28, 1994, now U.S. Pat. No. 5,521,980.

BACKGROUND OF THE INVENTION

1. Field of the Invention

This invention relates to cryptographic systems for electronic transfer of information, and more specifically to methods for improving the practicality and the security of such systems.

2. Description of the Prior Art

In a public-key cryptographic system for electronic transfer of information, a user party performs a cryptographic action (meaning a cryptographic task that can only be performed knowing a secret key) with respect to a public key that has been issued or validated by an issuing party. The cryptographic action can be verified off-line by a receiver party if the public key is accompanied by a digital certificate of the issuing party on the public key. When the verification is performed on-line by the issuing party, and the issuing party can recognize the public keys it issued, no digital certificate is needed.

In order to perform public-key cryptographic computations each party must have at least one computing device at its disposal. Any one of the following three configurations may be used by a user party: a tamper-resistant computing device; a computing device that the user party, at least in principle, can fully control, henceforth referred to as a user-controlled computing device; or, both a tamper-resistant computing device and a user-controlled computing device. A tamper-resistant computing device often security for the party in whose interest it acts, typically the issuing party, when the decision of whether to perform the cryptographic action may not be made by the user party itself. An access control mechanism for the tamper-resistant computing device offers protection to the user party against loss or theft. The use of a user-controlled computing device is appropriate when communication between the computing device of the user party and the outside world can only be handled satisfactorily by a desktop computer or the like, or when the secret key of the computing device may be known to the user without loss of security. The use of a tamper-resistant computing device together with a user-controlled computing device offers the advantage of both; the tamper-resistant device offers security and, when it is small, convenient portability between application platforms, and the user-controlled device offers ease of communication and secure data entry and display means for the user party.

An important example of a public-key cryptographic system for electronic transfer of certified information is an electronic payment system. In a first type of electronic payment system, a digital signature provided by a computing device of a user party serves as a promise-to-pay, validating for example a debit or credit card payment. Because no value is stored by the computing device, the user party can be allowed to know the secret key of its computing device, and any one of the three abovementioned configurations can be used.

A second type of electronic payment system is a pre-paid, electronic purse system. Here, a computing device of a user party maintains a counter, representing the amount of electronic cash held by the user party. To transfer an amount, the computing device digitally signs with respect to its public key a message specifying at least the amount, and correspondingly decreases its counter. To prevent the user party from making payments without involvement of the counter, the computing device must be tamper-resistant.

A third type of electronic payment system is one in which payments of a user party are untraceable and, at least to some degree, unlinkable. Value is represented either by a counter in a tamper-resistant device, or in the form of digital coins. Privacy of electronic payments can be attained in either one of two different ways: stored-value tamper-resistant computing devices are issued anonymously (for untraceability), and may be freely exchanged amongst user parties (for unlinkability); or suitable cryptographic techniques are used for blinding digital coins when issued.

While much research has been done to improve the security and practicality of public-key cryptographic systems for electronic transfer of information, several shortcomings have not yet been addressed or overcome.

A first problem relates to the fact that a smart card or a PCMCIA card, which are typical embodiments for a tamper-resistant computing device, can rapidly perform a cryptographic action such as digital signing only by using a special-purpose cryptoprocessor; ordinary 4 or 8-bit microprocessors typically take many minutes. To improve efficiency somewhat, a digital signature scheme can be used for which the bulk of the required computations can be pre-processed, and the remaining task can be performed efficiently by a simple processor. This improvement is not satisfactory for applications where signatures frequently need to be produced at substantially unpredictable moments. Server-aided computation does not allow delegation of the pre-processing phase to an untrusted powerful processor to such an extent that a non-sophisticated processor can rapidly perform the remaining computational task. Delegation of the pre-processing phase to a powerful processor of a trusted party that knows the secret key of the tamper-resistant device (See, Naccache, D., M'Raïhi, D., Raphaeli, D., and Vaudenay, S., "Can D.S.A. be Improved?—Complexity Trade-Offs with the Digital Signature Standard—," Pre-proceedings of Eurocrypt '94, pp. 85–94) suffers from the following problems: the tamper-resistant device needs to store all pre-computed values in EEPROM, which is fairly limited for ordinary smart card processors; (re-)loading the card with pre-computed values requires bringing it into direct contact with a terminal of the issuing party, which is often inconvenient, and enables the smart card to send privacy-related information to the trusted party and vice versa; and, the trusted party has the ability to forge signatures with respect to the public key of the tamper-resistant computing device, since it knows the secret key used by the tamper-resistant computing device to perform its cryptographic action.

Another problem is the potential damage due to loss or theft of computing devices. While password or biometric verification may prevent opportune criminals from operating computing devices of other parties, it certainly does not protect against determined criminals who can by-pass password or biometric verification mechanisms. The expected damage caused by such criminals can be limited somewhat by requiring user parties to report stolen or lost computing devices, and correspondingly distribute blacklists, but this measure is not entirely satisfactory for large-scale applications.

A third problem relates to the setting in which a user party holds both a user-controlled computing device and a tamper-resistant computing device. In this setting the tamper-resistant computing device typically holds a secret key needed to perform the cryptographic action, and the user-controlled computing device serves mainly as a convenient interface to the outside world and to offer secure data entry and display means to the user party. An access control mechanism does not protect sufficiently against loss or theft of the tamper-resistant device, since determined criminals can be expected to be able to by-pass that. Storing the public key of the tamper-resistant computing device and, if present, an issued digital certificate thereon, only in the user-controlled computing device hardly improves security, because they can be learned by wire-tapping, or participating in, an execution of the cryptographic action performed by the tamper-resistant device.

Other problems relate specifically to privacy-protected off-line electronic payment systems. When value is represented by counters in tamper-resistant computing devices, which can be obtained anonymously and may be exchanged freely amongst user parties, it is awkward to trace fraudulent parties that have managed to by-pass counters, inconvenient to reload devices anonymously (other anonymously obtained tokens must be given in exchange), and devices cannot be protected with an access control mechanism. When privacy is obtained by applying cryptographic techniques for blinding issued digital coins, such as described and claimed for example in patent application Ser. No. 08/203,231, filed Feb. 28, 1994, amounts frequently can be paid only by using many digital coins, and it is possible to have digital coins at ones disposal without being able to pay a specified amount. To overcome the problem of counter-based systems on the one hand, and of digital coins on the other hand, a privacy-protected off-line payment system has been proposed in the prior art in which value is represented by counters, while payments are made using blindly issued digital cheques (See, Bos, J., and Chaum, D., "SmartCash: A Practical Electronic Payment System," Centrum voor Wiskunde en Informatica, Report CS-R9035, August 1990. See also, Chaum, D., "Optionally moderated transaction systems," U.S. patent Ser. No. 5276736). A serious problem of this system is that a determined criminal, who manages to extract the contents of his tamper-resistant computing device, can spend withdrawn cheques over and over again, without being traceable; anonymous publication of the contents of a compromised tamper-resistant device can seriously cripple the system. No privacy-protected off-line electronic payment system is known that overcomes the practical problems associated with digital coins without significantly degrading security.

Another problem with the known privacy-protected off-line payment systems based on the blinding concept is that they do not offer the possibility of currency conversion. In cross-boundary payment applications this may pose a serious problem to the acceptability of these systems.

SUMMARY OF THE INVENTION

Accordingly, it is an object of the present invention to:

allow efficient public-key cryptographic systems for electronic transfer of information based on tamper-resistant computing devices, without using special-purpose cryptoprocessors;

increase security in cryptographic systems for electronic transfer of information against criminals who are able to gain full control over computing devices of other parties;

increase security in cryptographic systems for electronic transfer of information in which user parties hold a user-controlled computing device and a tamper-resistant computing device;

allow efficient implementation of privacy-protected off-line electronic cheque systems while offering security against criminals who can extract the contents of tamper-resistant computing devices;

allow efficient implementation of the resulting cheque systems without using special-purpose cryptoprocessors for the tamper-resistant computing devices of account holders;

enable currency conversion in privacy-protected public-key cryptographic systems for off-line electronic payments; and allow efficient, economical, and practical apparatus and methods fulfilling the other objects of the invention.

In accordance with the objects of the invention, a brief summary of the invention is now presented. Some simplifications and omissions may be made in the following summary, which is intended to highlight and introduce some aspects of the present invention, but not to limit its scope. Detailed descriptions of preferred exemplary embodiments adequate to allow those of ordinary skill in the art to make and use the invention are provided later.

The invention shows a first inventive technique to allow practical public-key cryptographic systems in which a user party holds a user-controlled computing device, UC, and a tamper-resistant computing device, TC that does not have a powerful processor. TC comprises a secret key and performs the public-key cryptographic action of digital signing with respect to the corresponding public key. To relieve the computational burden of TC a digital signature scheme is used for which the bulk of the computations can be pre-processed, and the remaining dependent computational task can be performed rapidly by a simple processor. The pre-processing is done by a powerful processor, IC, simulating the required random numbers using pseudo-random numbers based on a serial number and a secret key known to both IC and TC. UC stores the pre-processed information, and provides it (or information computed from it) to TC when a digital signature is to be produced by TC. Since the computation of digital signatures typically is not synchronized with the pre-processing phase, UC needs to ensure that the pre-processed information it provides to TC is synchronized with the pre-processed information TC expects to receive; several methods for this are described in the detailed description. Note that TC does not need to store pre-processed information in non-volatile memory, and never needs to be brought in direct contact with IC.

Also shown is a second inventive technique for improving security against criminals who gain full control over computing devices of other parties, whether tamper-resistant or not. Hereto the access control mechanism of the computing device is integrated with the cryptographic scheme applied by the computing device for performing its cryptographic action. More specifically, the secret key needed to perform the cryptographic action is taken to be a function of information held by the computing device and access information that is provided by the party that holds or controls the computing device. After use, the computing device erases the provided access information, and any other information that has been computed based on the provided access information. It is also shown that taking the function to be one-way with respect to the access information has the advantage that the secret key can be stored during a whole session, without enabling the access information to be derived from its contents.

Further shown is a third inventive technique for increasing security in cryptographic systems for electronic transfer of information in which a user party holds a user-controlled computing device, UC, and tamper-resistant computing device, TC. The method for protecting against loss or theft of TC is motivated by the fact that it will be much harder for criminals to obtain both computing devices, for instance because of the sheer weight of a typical embodiment of UC (e.g., a desktop computer), or because UC and TC can be held in separate places when not in use. The secret key corresponding to the public key of TC is hereto taken to be a function of a secret key held by TC and a secret key held by UC. Two methods are detailed, one in which UC provides it secret key to TC when a cryptographic action is to be performed by TC, the latter erasing it after use, and the other in which UC never reveals its secret key to TC. With the latter method TC can never leak the secret key corresponding to its public key, and so signatures with respect to it cannot even be forged by the party that provided TC.

A fourth inventive technique is shown for designing practical privacy-protected off-line electronic cheque systems offering security against criminals who can physically extract the contents of tamper-resistant devices. Instead of representing value by digital coins, the amount of electronic cash held by an account holder is represented by a counter in a tamper-resistant computing device, TC. This eliminates the use of many digital coins to transfer one amount, and ensures that account holders never need to be in a position where they still have digital coins but cannot make up the amount to be paid. Electronic cheques are withdrawn from the bank in a cheque withdrawal protocol, and written in a cheque payment protocol for any amount up to a predetermined maximum. A built-in cryptographic mechanism, called restrictive blinding and described in patent application Ser. No. 08/203,231, filed Feb. 28, 1994, guarantees that a double-spent cheque can be traced to the account holder that withdrew the cheque.

By applying the first inventive technique, the tasks of the account holder in the cheque system can be performed efficiently by a TC that does not have a sophisticated cryptoprocessor. Furthermore the second and third inventive techniques can be applied, so that security is offered against determined criminals who try to double-spend electronic cheques of other account holders by extracting the contents of stolen computing devices.

Still further shown is an inventive technique to allow currency conversion in the electronic cheque system. The inventive technique ensures security of the currency conversion mechanism without requiring tamper-resistance for payees. Hereto the bank encodes in the cheque withdrawal protocol a table of currency conversion rates into the issued cheques, and the two parties involved in the cheque payment protocol select from this table the conversion rate applicable to the two currencies involved.

Other features, objects, and advantages of this invention will be appreciated when the description and appended claims are read in conjunction with the figures.

DETAILED DESCRIPTION OF THE INVENTION

Figure 1:
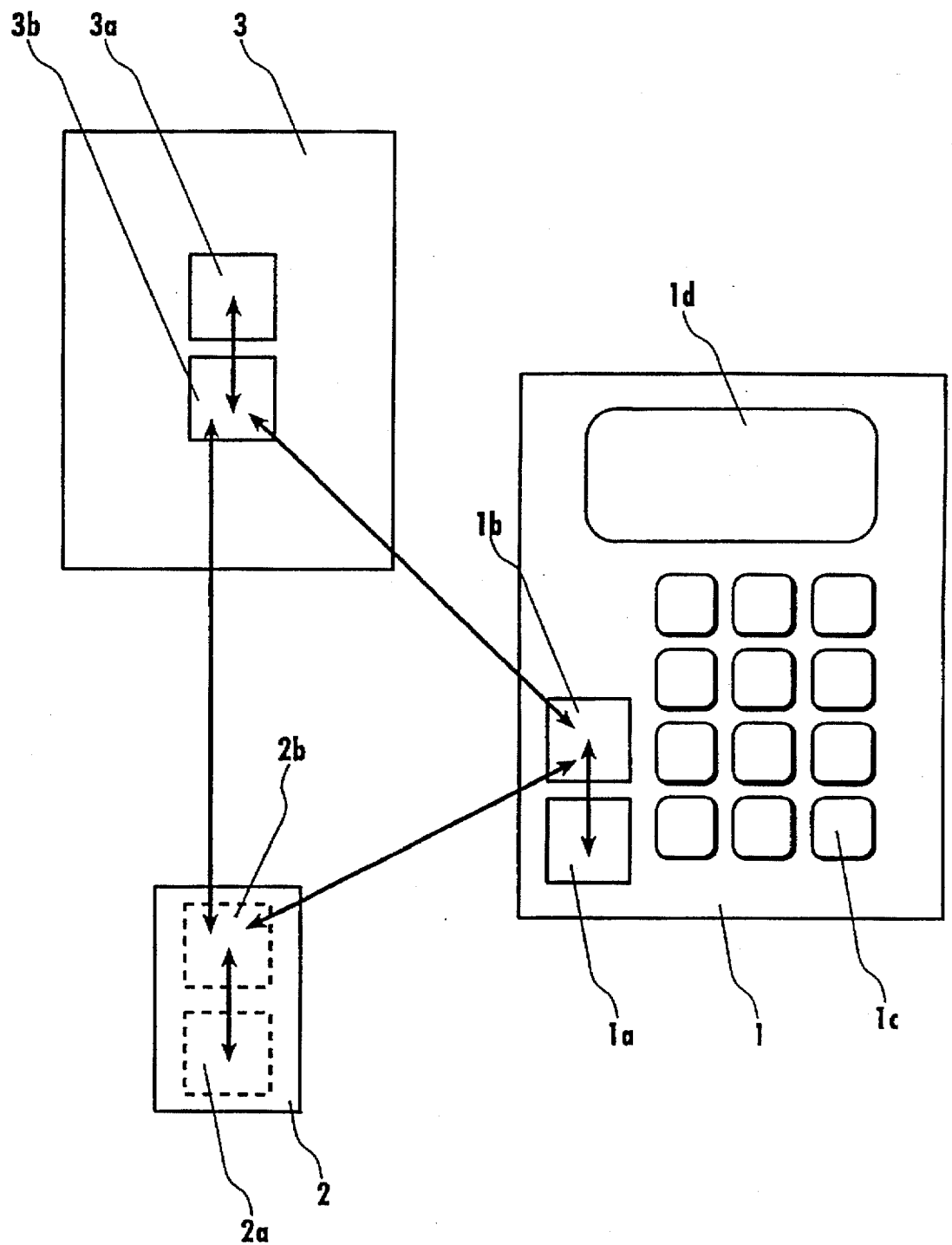
FIG. 1 shows a block diagram of a preferred embodiment including a tamper-resistant computing device for a user party, a user-controlled computing device for a user party, and a computing device for a receiver party or an issuing party, in accordance with the teachings of the present invention.

While it is believed that the notation of FIGS. 2 to 12 would be clear to those of ordinary skill in the art, it is first reviewed here for definiteness.

The actions performed by the computing devices that participate in the protocols, on behalf of the parties that hold or control them, are grouped together into flowchart boxes. The actions described in a flowchart box are performed by a computing device indicated at the top of the column that the box is in. Each line in a box describes a step, such as a computation, transmittal or storage. Flowcharts must be read from top to bottom, box by box, and, within boxes, line by line.

The symbol "←" denotes assignment, meaning that the variable or symbol on its left-hand side is assigned the value or values on its right-hand side to. Assignments do not necessarily imply the reservation of storage space, but can refer to intermediate computations performed in RAM.

A test for equality is indicated by the symbol "$\stackrel{?}{=}$," and the symbol "$\stackrel{?}{\neq}$" denotes a test for inequality. Unless specified otherwise, the present invention is not concerned with what should happen in case an indicated equality or inequality does not hold.

The symbol "$\in_R$" indicates that the number or numbers on its left-hand side are chosen from the set on its right-hand side according to a probability distribution that is substantially uniform and independent. A physical random number generator may be used, possibly in conjunction with additional post-processing. Alternatively, deterministic pseudo-random number generators may be used.

The word "Send," followed by a colon and at least one number, indicates that the at least one number is sent by the computing device performing the actions, described in the corresponding box, to another computing device, indicated by the connections between the flowchart boxes.

Some steps are surrounded by square brackets, "[" and "]," indicating that the step is optional or can be performed by another party.

The meaning of other operations, usually described by words, is described in the corresponding detailed description.

In all figures for explicitness the following setup is assumed for the cryptoscheme employed by the computing device that has to perform a cryptographic action. Computations are performed in a group, denoted by $G_q$, that contains q numbers, where q is a publicly known prime number. Without loss of generality, the group operation is assumed to be multiplication. Efficient algorithms should be available for recognizing, testing equivalence of, and multiplying numbers in $G_q$, but not for computing discrete logarithms. An expression involving a number in $G_q$ indicates a computation in $G_q$. For computations in the ring, $Z_q$, the modulo operator is denoted explicitly.

A public key for a computing device of a user party comprises two numbers, g and h, in $G_q$, where g is a number in $G_q$ unequal to 1 that preferably is used system-wide, and h is equal to $g^x$ for a randomly generated secret key $\chi$ in $Z_q$. It will be assumed for explicitness, but without loss of generality, that the computing devices of user parties compute digital signatures, using the Schnorr signature scheme (See, Schnorr, C, "Efficient Signature Generation by Smart Cards," Journal of Cryptology, Vol. 4, No. 3 (1991), pp. 161–174). Hence a digital signature on a message, m, is a pair of numbers, (c, r), in $Z_q$, such that c is equal to $\mathcal{H}(m, g^r h^{-c})$. Here, $\mathcal{H}(\cdot)$ is a publicly known collision-resistant hash-function (meaning that it is infeasible to find different arguments that are mapped to the same outcome) that can be evaluated rapidly and preferably is used system-wide. An candidate such function is the SHA (See, Accredited Standards Committee X9, "Working Draft: American National Standard X9.30-1993: Public Key Cryptography Using Irreversible Algorithms for the Financial Services Industry: Part 2: The Secure Hash Algorithm (SHA)," 1993).

The use of the Schnorr digital signature scheme is only intended to be suggestive, and not limiting in any way. It will be clear to those of ordinary skill in the art that the inventive techniques can be applied to many other signature schemes, and also to cryptographic actions other than digital signing. Suitable alternatives are suggested, where appropriate, in the detailed description.

Turning now to FIG. 1, a description of the preferred apparatus for the present invention will now be described in detail.

Block 1 represents a user-controlled computing device for a user party. It comprises memory means 1a, processing means 1b, and also data entry means 1c and display means 1d, interfaced by suitable means well-known in the art. The interface between memory means and processing means is indicated by a double-sided arrow. If the user-controlled computing device is personalized, then password or biometric user-verification means may be present. Block 1 also comprises a first interface means to communicate with a computing device of a receiver party or of an issuing party, as described by Block 3. In case the user party holding the computing device also holds an additional tamper-resistant computing device, such as described by Block 2, a second interface means serves to communicate with the tamper-resistant device.

A typical embodiment of Block 1 is a desktop computer, a laptop or notebook computer, or a handheld computer. User parties may own various user-controlled computing devices, and transfer the data stored in one device to another, for instance to switch between payment platforms. The communication interfaces might be by direct electrical connection, by infra red, or by electromagnetic waves, sound waves, and the like. In the detailed descriptions of FIGS. 2 to 12, a user-controlled computing device is denoted by UC.

Block 2 represents a tamper-resistant computing device for a user party. It comprises memory means 2a and processing means 2b, and stores at least one secret key. The interface between memory means and processing means is indicated by a double-sided arrow. In the absence of a battery or the like, the tamper-resistant computing device is powered by another computing device when interfaced to it. Block 2 also comprises at least one interface means to communicate with other computing devices. Depending on the application, the interface means may communicate only with a user-controlled computing device, or also directly with the computing devices of issuing or receiver parties.

A typical embodiment of Block 2 is a smart card or a PCMCIA card. In the detailed descriptions of FIGS. 2 to 12, a tamper-resistant computing device is denoted by TC.

Block 3 represents a computing device controlled by an issuing party, as well as a computing device controlled for use by a receiver party. It comprises memory means 3a and processing means 3b. Depending on the application, and whether the computing device is associated with the issuing party or with the receiver party, it may also comprise display means and data entry means. Block 3 comprises at least one interface means to communicate with other computing devices, such as a user-controlled computing device described by Block 1.

A typical embodiment for a computing device of an issuing party is a tamper-resistant terminal, such as a teller machine or a powerful central computer that can be accessed remotely by telecommunications. For a receiver party, a typical embodiment is a terminal that is directly accessible at the point of transaction, a server that is accessible over a computer network such as the Internet, or a user-controlled computing device described by Block 1. In the detailed descriptions of FIGS. 2 to 12, a computing device controlled by an issuing party is denoted by IC, and a computing device for use by a receiver party by RC.

Figure 2:
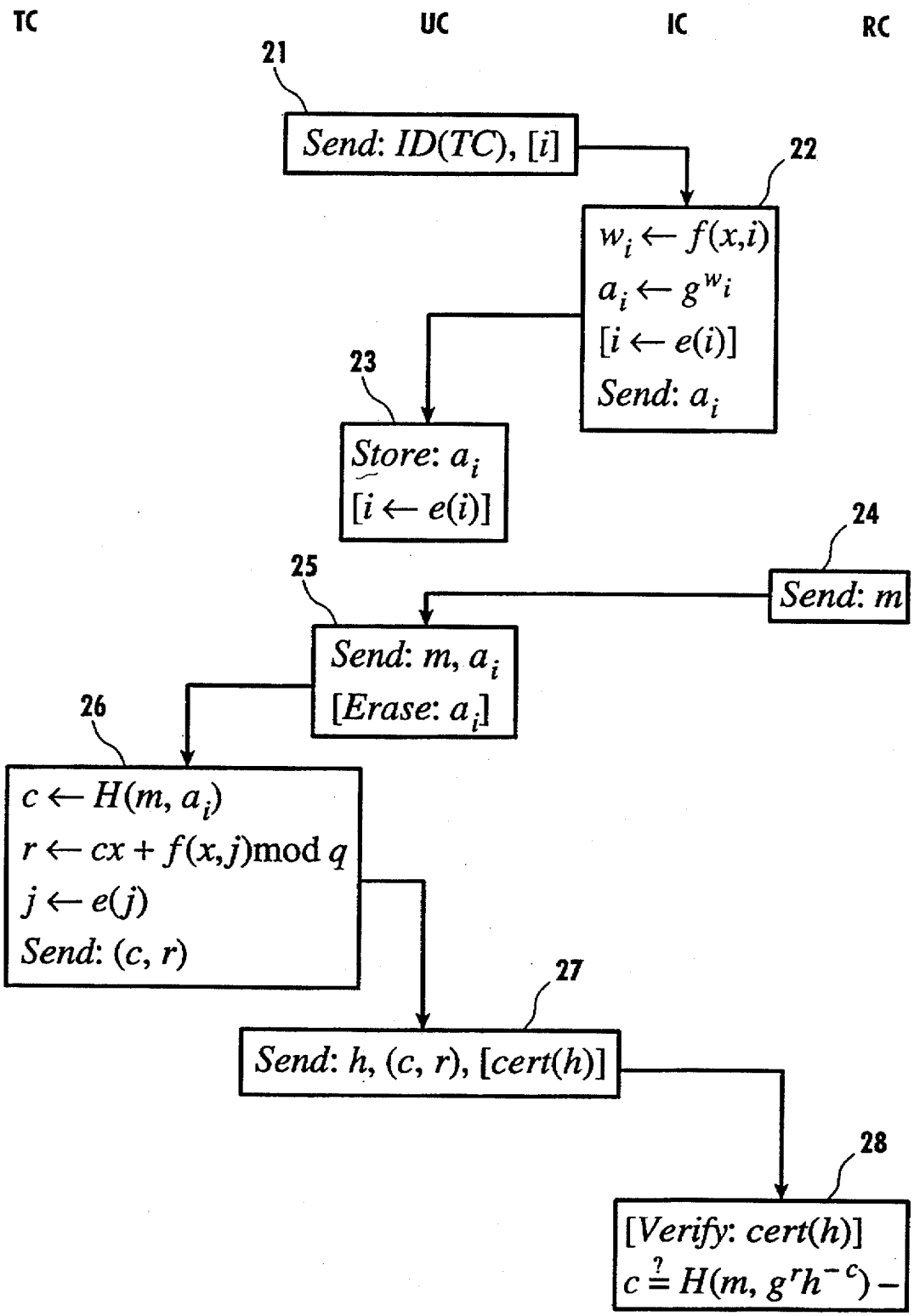
FIG. 2 shows a flowchart of an issuing protocol for a public-key cryptographic system for electronic transfer of information, in which a tamper-resistant computing device without a powerful processor can efficiently compute digital signatures, in accordance with the teachings of the present invention.

Turning now to FIG. 2, a flowchart of an issuing protocol for a public-key cryptographic system for electronic transfer of information, in which a user party has at its disposal a user-controlled computing device, UC, and a tamper-resistant computing device, TC, without a special-purpose cryptoprocessor, will now be described in detail.

Box 21 shows UC providing to IC information, denoted by ID(TC), that enables IC to look up the secret key, x, used by TC. For example ID(TC) can be an identification number of TC, its public key h, or, if TC is personalized, a proof of knowledge by TC of $\log_g h \bmod q$. Box 21 also shows UC sending a "serial" number, i, to IC. This step is optional, since IC may (be able to) determine i by itself. Ways to determine i are given shortly. It is noted that i may previously have been provided to UC by TC.

The first line of Box 22 shows IC computing a number, $w_i$, in $Z_q$, by computing $f(x, i)$. Here, $f(\cdot)$ is a one-way (hash)

function, such as the SHA, that maps its arguments to $Z_q$, and that can be evaluated efficiently; it serves as a pseudo-random number generator. The description of $f(\cdot)$ has previously been stored in TC. For greater security, the specification of $f(\cdot)$ may be kept secret by the party controlling IC. As shown in the second line, IC next computes $g^{wi}$, denoted by $a_i$. Optionally, as shown in the third line, IC then updates i to a new value, e(i), where $e(\cdot)$ is a function that can be evaluated efficiently and does not have short cycles, so that i will differ for each execution of the issuing protocol. An example function $e(\cdot)$ is one that increases its argument by one. In case UC always provides i to IC, in Box 21, IC need not compute it or keep track of it. Alternatively, $e(\cdot)$ can be more complex, perhaps a one-way hash-function, and its description is kept secret by the party controlling IC. The fourth line shows IC providing $a_i$ to UC.

The computation of $w_i$, in the second line of Box 22, need not be based on the secret key x that TC uses to compute digital signatures; $w_i$ can alternatively be computed as $f(y,i)$, where y is an independently generated secret key of TC that is known also to IC. There also need not be a corresponding public key for y. If x is installed in TC, say during the manufacturing process, in such a way that only TC knows y, then no party will be able to forge signatures with respect to the public key, h, of TC.

The first line of Box 23 shows UC storing the number, $a_i$. The second line is an optional step, and shows UC updating the value of i. In case IC in Box 22 determines i by itself, this step can be omitted. If the description of $e(\cdot)$ is not public then UC cannot perform the step; in that case, when UC in Box 21 needs to provide i to IC, it can request TC to send the appropriate value.

Box 24 shows RC providing a message, m, to UC, for which a digital signature is to be produced by TC. Alternatively the message is provided by another party, or UC can select one by itself or have the user party enter it using the data entry means.

The first line of Box 25 shows UC providing m and $a_i$ to TC. It is important that UC sees to it that the number i is the same as the number j that TC will use in the second step of Box 26, to be described. In other words, the serial numbers used by UC must be synchronized with those expected by TC. Hereto UC can use a first-in first-out (FIFO) queue to store $a_i$'s retrieved in successive executions of the issuing protocol (first line of Box 23). Alternatively, UC first requests TC to provide the member j that it will use in Box 26, and then looks up the corresponding $a_j$ in a "table" of stored $a_i$ values. As is shown by the second line, UC then (optionally) erases $a_i$, since it has no further use.

The first line of Box 26 shows TC computing a number, c, based on the number, $a_i$, that it just received. Depending on the application, TC may in addition verify the received message, for instance against a list of allowed messages, or perform an appropriate action based on the message contents. In a pre-paid counter-based electronic purse application, for example, m might denote an amount of electronic cash and TC decreases its counter by the amount specified by m; see FIG. 7, to be described. Alternatively, if the message contents are not of interest to TC, then UC can provide c instead of $a_i$ to TC in Box 25. As is shown in the second line, TC next computes r according to $cx+f(x,j)$ mod q. Due to the synchronization ensured by UC, the value of j is the same as the value of i. As shown in the third line, TC then updates the value of j, to e(j). The old value of j can be overwritten. Finally, as shown in the fourth line of Box 26, TC sends the digital signature, (c,r), to UC. Actually, only r needs to be sent, since UC can compute c by itself.

For certain embodiments of TC it may be preferable to take $e(\cdot)$ such that the updating of j only requires the change of a few bits. If $e(\cdot)$ increases its argument by one, and j is stored using the well-known Gray code, then only one bit must be changed each time.

The first line of Box 27 shows UC providing to RC the public key of TC and the digital signature on m. If desired, UC can first verify the correctness of the signature by checking whether c is equal to $\mathcal{H}(m,g^r h^{-c})$. If the verification of signatures is to take place off-line, then UC in addition may have to provide a digital certificate, cert(h), of IC on h. Note that h and the digital certificate (if present) need never be stored by TC, since they can be stored by UC.

The first line of Box 28 shows RC verifying the correctness of the digital certificate on h, if any has been provided. The second line shows RC verifying the digital signature on m.

The computations in the first three lines of Box 26 are the only computations that TC needs to perform in order to produce a digital signature on m, and they can be performed rapidly without using a special-purpose cryptoprocessor-an ordinary 4-bit or 8-bit smart card processor, say, will certainly suffice. Since TC does not perform computations in $G_q$, it does not need to store software to perform operations in $G_q$; only q must to be stored, and algorithms for multiplying and adding modulo q, and for evaluating $\mathcal{H}(\cdot)$, $e(\cdot)$ and $f(\cdot)$. Furthermore, since UC provides $a_i$ only when a signature is to be made, no per-signature non-volatile storage space is required for TC.

This completes the description of the first inventive technique of the present invention. As will be clear to those of ordinary skill in the art, digital signature schemes other than the Schnorr signature scheme can be used by TC. For the inventive technique to be applicable, the signature scheme used by TC must be such that almost all of computational effort for computing a signature is independent of the message to be signed, and the remaining computational task, which can only be performed once the message to be signed has been received, can be performed rapidly without using a special-purpose cryptoprocessor. Suitable alternative signature schemes are the DSA (See, NIST, "Specifications for a digital signature standard (DSS)," Federal Information Processing Standards Pub. (draft), Aug. 19, 1991) and the ElGamal signature scheme (See, ElGamal, T., "A public key cryptosystem and a signature scheme based on discrete logarithms," IEEE Transactions on Information Theory, Vol. IT-31, No. 4, July 1985, pp. 469–472), and modifications of these schemes.

Furthermore, the inventive technique also can be applied to other public-key cryptographic actions. In general, it is applicable when the bulk of the computations in the public-key cryptographic action performed by TC are independent of the information (provided by a receiver party) to which it is to be applied, and the remaining computational task can be performed rapidly without using a special-purpose cryptoprocessor. Using the inventive technique, the task of the tamper-resistant computing device in for example the "validator issuing" and "validator signing" protocols described in Cramer, R., and Pedersen, T., "Improved Privacy in Wallets with Observers," Advances in Cryptology—EUROCRYPT '93, Lecture Notes in Computer Science, no. 765, Springer-Verlag, pp. 329–342, can be implemented efficiently without needing special-purpose cryptoprocessors. The same holds for the task of the tamper-resistant computing device in the protocols described in Chaum, D., "Optionally moderated transaction systems," patent Ser. No. 5276736. Another example is the cryptographic action of identification, using the Schnorr identification scheme (See, Schnorr, C, "Efficient Signature Generation by Smart Cards," Journal of Cryptology, Vol. 4, No. 3 (1991), pp. 161–174) or identification schemes related to the DSA or the ElGamal signature scheme.

Figure 3:
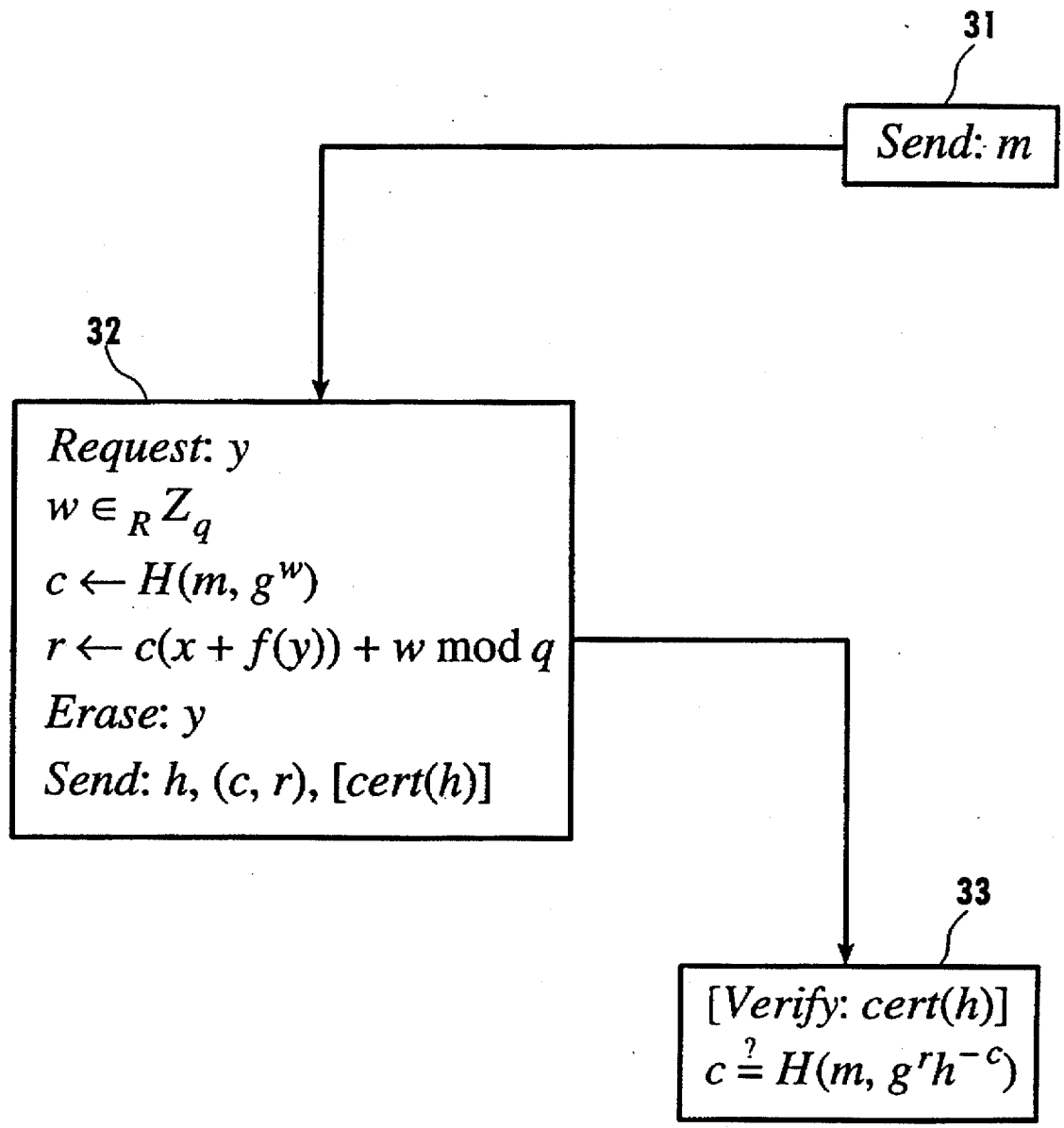
FIG. 3 shows a flowchart of a cryptographic system offering security against criminals who gain full control over computing devices of other parties, in accordance with the teachings of the present invention.

Turning now to FIG. 3, a flowchart of a cryptographic system offering increased security against criminals who are able to gain control over computing devices of other user parties, will now be described in detail.

The actions in the first column are performed by a computing device that holds a secret key, such as TC or UC, or a computing device of a receiver party or an issuing party. As in FIG. 2, the secret key of the computing device is assumed to be a number, x, in $Z_q$. The public key of the computing device is equal to $g^{x+f(y)}$, denoted by h, where y is access information in $Z_q$ known only to the party holding or controlling the computing device. In other words, the secret key corresponding to the public key h of the computing device is divided between the party and the computing device.

Box 31 shows RC sending a message to the computing device. Alternatively, the message can be determined by another party, or by the computing device itself.

The first line of Box 32 shows the computing device requesting the party that holds or controls it to enter the access information, y. For example, if the computing device is a personal computer of a user party, the request can be displayed on screen; if the computing device is a tamper-resistant smart card attached to a laptop computer by means of smart card reader, the smart card can signal the laptop computer to display a message on the screen. Alternatively, no message or the like is displayed and the signal is provided in another form, like a blinking cursor on a display screen, or it is simply known that the first thing to do before the computing device can be used is to provide access information. The second line shows the computing device generating a random number, w, in $Z_q$. The third line shows the computing device computing c according to $\mathcal{H}(m, g^w)$, to prepare for a Schnorr digital signature. Then, as shown in the fourth line, the computing device computes r according to $c(x+f(y))+w \mod q$. Here, the function, $f(\cdot)$, is either a one-way function or the identity function, depending on the application; more about this will be said below. The fifth line shows the computing device erasing the provided access information, y, from its memory, preferably by overwriting it. Note that the provided access information need never be stored in non-volatile memory by the computing device. To erase the access information after use, the computing device can overwrite its RAM with zeros. More generally, the computing device must erase all information that enables feasible computation of the secret key; in case intermediary results, derived from the provided access information, have been generated, they also need to be erased. In particular, the secret key itself, if it has ever been computed explicitly, must be erased, although this need not be done immediately; see the discussion below. Finally, as shown in the sixth line, the computing device provides to RC its public key h, the digital signature on m, and (optionally) a digital certificate of an issuing party on h.

Box 33 shows RC verifying (optionally) the digital certificate, and the digital signature on m, and is the same as Box 28.

In many off-line applications, the public key of the computing device must be certified by an issuing party. Initializing the computing device so that the secret key, $x+f(y) \mod q$, is divided between the device and its holder can still be done, even if the device is tamper-resistant and its holder is not known at the time of manufacturing. Hereto the device initially needs to have the whole secret key, $x+f(y) \mod q$, stored in non-volatile memory that can be written at least once. The first time the computing device is operated it subtracts $f(y)$, where y is the provided access information, from the secret key, and overwrites it with the new value, x. Using this mechanism, the party holding or controlling the device can even be allowed to change its access information from time to time. Another method prevents the computing device from ever knowing the secret key, $x+f(y) \mod q$. Hereto, the party holding or controlling the computing device provides $g^{f(y)}$ to the issuing party, and only x is stored in the computing device. The issuing party then computes the public key for the computing device by multiplying $g^x$ by $g^{f(y)}$, resulting in h, and validates h.

Since the secret key, corresponding to the public key, h, is never present for a long time in the computing device, but only for a short time and when the computing device is operated by its legitimate holder, protection is offered against theft or loss, regardless of whether the computing device is tamper-resistant or not. Preferably the access information is infeasible to determine by using an exhaustive computerized search. A randomly chosen eight-byte password should certainly suffice, with the current state of technology. For some applications even a biometric, which certainly is not random, may offer a satisfactory level of security. For example, if the computing device is a smart card that can be obtained anonymously, and retina patterns of individuals are not publicly available, then access information in the form of a retina biometric will offer some protection when a card is lost on the street.

The closer in time the erasing of the provided access information takes place after the moment of the performed cryptographic action, the greater the security against theft or loss. For greater convenience, the access information it can be provided only once, at the beginning of a session, and the secret key can be stored until the end of the session; in this way the access information does not have to be entered each time a cryptographic action is to be performed in the session. In this case it may be preferable that $f(\cdot)$ be a one-way function, so that the access information cannot easily be determined from the secret-key part held by the computing device and the secret key. (More generally, the function according to which the secret key is computed from the part held by the computing device and the access information, should then be one-way with respect to the access information.) For example, if the tamper-resistant computing device is a PCMCIA card that is interfaced to a desktop computer, from which it receives its electrical power, the PCMCIA card may request entry of the access information immediately on insertion into the PCMCIA slot, when it is powered; it then stores the secret key during the whole session in its RAM, and erases the provided access information; and it zeroos its RAM when the power connection is broken, which is when it is removed from the PCMCIA slot.

As a further example, consider the computing device being a workstation connected to the Internet, and the secret key being used by installed software to encrypt e-mail messages before they are sent out. To gain access to its account, a user party at the start of a session must type in a password. With the conventional approach, the password mechanism would be independent of the encryption mechanism. With the inventive technique, the encryption software would pick a secret key by generating a, preferably random, number and combining it arithmetically with the password, for example by adding the (random) number to a one-way function of the password. Only the (random) number is stored permanently on the hard disk of the workstation, perhaps in encrypted form. The secret key becomes available to the software after the controlling party has logged in, and (if desired) remains available until the end of the session; the provided password, however, is not stored. When the user party changes its password, the (random) member is overwritten by the encryption software with a new number, such that the combination of the new number with the password still results in the same secret key. This is convenient because the public key does not need to be changed.

As will be appreciated, the inventive technique of integrating the access control mechanism with the cryptographic action performed by the computing device, by letting the secret key required to perform the action be a function of the access information and a secret key part inside the computing device, is generally applicable. More specifically, it can be used in any situation in which a computing device, whether tamper-resistant or not, holds a secret key, regardless of whether the cryptographic action uses public-key cryptographic techniques or only conventional ones. Furthermore, the combination of the access information and the secret key part in the computing device, resulting in the secret key, can be any suitable function of the access information and the secret key part held by the computing device. A degenerated case is to let the secret key, corresponding to the public key of the computing device, be the same as the access information. This may be much less desirable, however, since criminals can now force the party holding or controlling the computing device to give up the secret key.

When a public-key cryptographic action is to be performed by the computing device, it can immediately verify the provided access information against its public key (or a one-way function of the access information, which should then be substantially independent of the function according to which the secret key is computed from the access information and the secret key part of the computing device), and, perhaps after having allowed a few trials, lock up If the verifications do not hold. In Box 32 the computing device can hereto verify that $g^{x+f(y)}$ is equal to its public key, h.

When used in conjunction with a conventional cryptographic scheme, however, the access information may not be verifiable directly by the computing device. Since the information computed by the computing device, for its cryptographic action, will be incorrect when false access information is provided, this need not be a problem. When messages are encrypted using, say, the bit-wise exclusive-or of the message and the secret key, so that only a receiver party knowing the same secret key can decrypt, even a small password can offer a satisfactory level of security, since guesses for the complete secret key cannot be verified other than by encrypting messages with random secret keys and hoping that the resulting ciphertexts will be accepted. For messages with significant redundancy the receiver party is highly likely to obtain a nonsensical message when decrypting, and hence will be informed that a fraud may be going on. Alternatively, the computing device stores a one-way function of the access information, to verify the provided access information directly; in this case the one-way function should be substantially independent of the function according to which the secret key is computed from the access information and the secret key part of the computing device.

Figure 4:
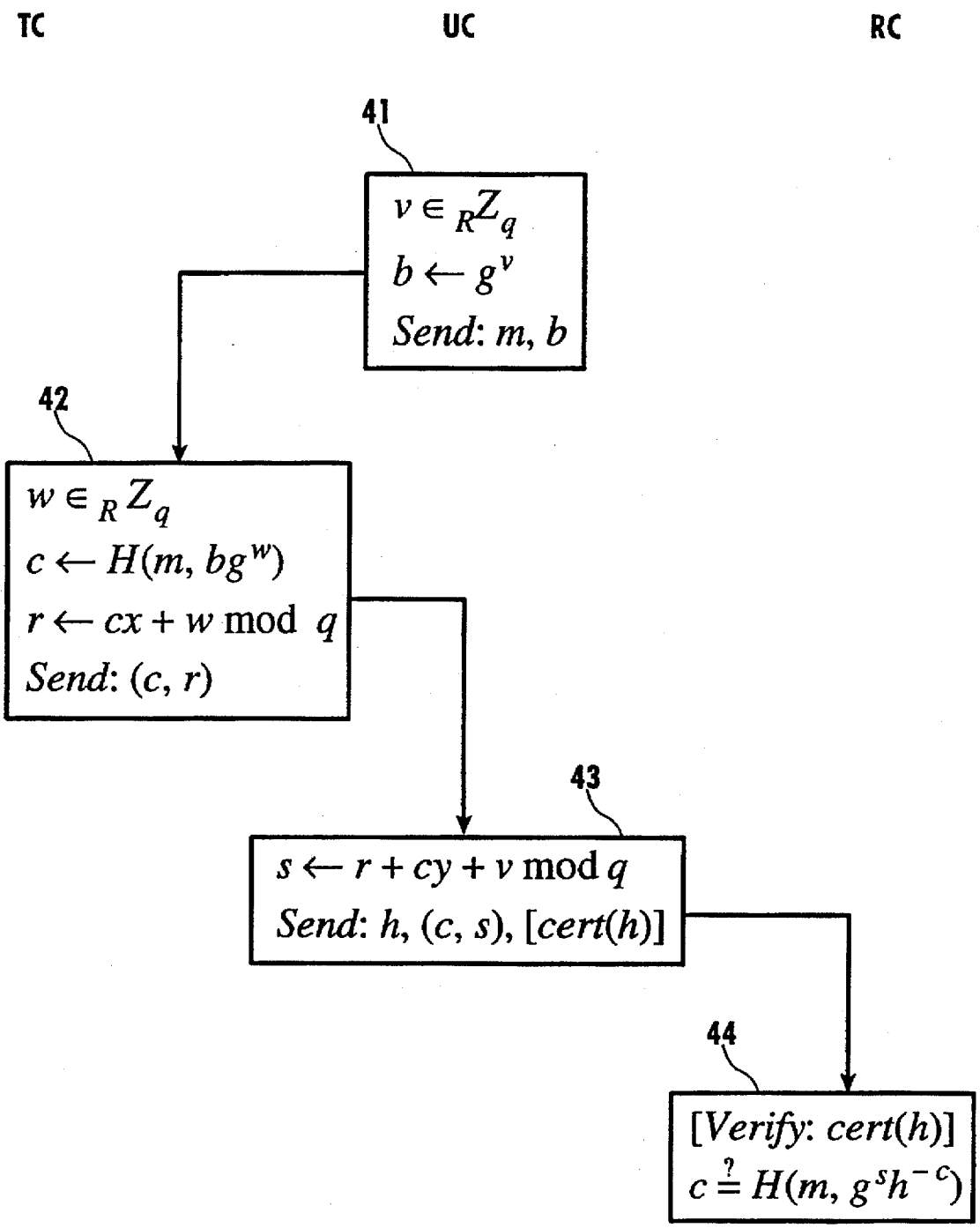
FIG. 4 shows a flowchart of a cryptographic system offering security against criminals who gain control over tamper-resistant computing devices of user parties, but not over their user-controlled computing devices, in accordance with the teachings of the present invention.

Turning now to FIG. 4, a flowchart of a cryptographic system in which a user party holds a user-controlled computing device, UC, and a tamper-resistant computing device, TC, the system offering security against loss or theft of TC, will now be described in detail.

As in FIG. 3 the secret key of TC is assumed to be a random number, x, in $Z_q$. The public key of TC is equal to $g^{x+y}$, denoted by h, where y in $Z_q$ is a secret key held by UC. In other words, the secret key corresponding to the public key, h, is divided between TC and UC.

The first line of Box 41 shows UC generating a random number, v, in $Z_q$. The second line shows UC computing $g^v$, denoted by b. As shown in the third line, UC then sends to TC a message, m, and the number b.

The first line of Box 42 shows TC generating a random number, w, in $Z_q$. The second line shows TC computing c according to $\mathcal{H}(m, b \cdot g^w)$, to prepare for a Schnorr digital signature. The third line shows TC computing r according to cx+w mod q. Then, as shown in the fourth line, TC sends the pair, (c,r), to UC.

The first line of Box 43 shows UC computing s according to r+cy+v mod q; the pair, (c,s), is a Schnorr signature on the message, m, with respect to the public key, h. The second line shows UC sending to RC the public key h, the digital signature on m, and (optionally) a digital certificate of an issuing party on h.

Box 44 shows RC verifying (optionally) the digital certificate, and the digital signature on m, and is the same as Box 28.

Certain variations will be obvious to those of ordinary skill in the art. For instance, v can always be zero, so that b is never used. A drawback of this efficiency improvement, however, is that a thief, who has managed to extract x from TC, might be able to determine the other part of the secret key, y, once he gets hold of a signature with respect to h. When the numbers, w, are generated deterministically by TC by using a pseudo-random number generator, as is the case when the technique described in FIG. 2 is applied, this is an easy task.

Another variation is for UC to provide its part of the secret key, y, to TC just before the signature is to be produced. TC can then compute the signature by itself, and erase y after use. A disadvantage of this approach is that the party that provided TC could have programmed it so as to not erase h. The party may then be able to learn the secret key corresponding to h, for instance when TC is returned for maintenance, or when TC can use a subliminal channel when performing the cryptographic action. The provider party can then forge digital signatures with respect to h.

The methods described for FIG. 3 for dividing the secret key between the access information and the information stored by the computing device can also be used here, for dividing the secret key between UC and TC.

By also applying the inventive technique of FIG. 3, so that the secret key corresponding to h in effect is divided between TC, UC, and access information of the user party, security is further improved. Furthermore, as with FIG. 3, the technique can also be applied in case the secret key is used in a conventional cryptographic action (i.e., when there is no public key corresponding to the secret key).

As will be clear to those of ordinary skill in the art, the technique applies equally well to many other digital signature schemes. See, for example, the following signature schemes, collectively referred to as digital signature schemes of the Fiat-Shamir type: Brickell, E., and McCurley, K., "An Interactive Identification Scheme Based on Discrete Logarithms and Factoring," Journal of Cryptology, Vol. 5, No. 1 (1992), pp. 29–39; Feige, U., and Shamir, A., "Witness Indistinguishable and Witness Hiding Protocols," Proceedings of the 22nd Annual ACM Symposium on the Theory of Computing, 1990, pp. 416–426; Feige, U., Fiat, A., Shamir, A., "Zero-Knowledge Proofs of Identity," Journal of Cryptology, Vol. 1, No. 2 (1988), pp. 77–94; Fiat, A., and Shamir, A., "How to prove yourself: practical solutions to identification and signature problems," Advances in Cryptology—CRYPTO '86, Lecture Notes in Computer Science, Springer-Verlag, pp. 186–194; Guillou, L., and Quisquater, J.-J., "A Practical Zero-Knowledge Protocol Fitted to Security Microprocessor Minimizing Both Transmission and Memory," Advances in Cryptology—EUROCRYPT '88, Lecture Notes in Computer Science, no. 330, Springer-Verlag, pp. 123–128; Okamoto, T., "Provably Secure and Practical Identification Schemes and Corresponding Signature Schemes," Advances in Cryptology—CRYPTO '92, Lecture Notes in Computer Science, no. 740, Springer-Verlag, pp. 31–53; and the DSA and the ElGamal signature scheme. Moreover, it also applies to cryptographic actions other than digital signing, such as identification (any of the identification schemes in the above references can be used) and encryption.

FIGS. 5 to 9 describe flowcharts for a privacy-protected off-line electronic cheque system offering security against parties that can extract the contents of tamper-resistant devices. In the system, the party controlling IC is a financial institution that can issue electronic cash, such as a bank, and UC is a user-controlled computing device of a user party.

The design of the system is based on the digital coin system described in Section 11.3 of patent application Ser. No. 08/203,231, filed Feb. 28, 1994. The inventive technique described in the present application allows the cryptographic mechanism for tracing double-spent coins, called restrictive blinding, and described in patent application Ser. No. 08/203,231, filed Feb. 28, 1994, to be combined with a counter-based representation of electronic value, without seriously degrading security. As will be clear to those of ordinary skill in the art, the inventive technique can also be applied to any of the other digital coin systems described in patent application Ser. No. 08/203,231, filed Feb. 28, 1994, and variations thereof based on the restrictive blinding technique.

The inventive techniques described by FIGS. 2 to 4 will not be shown applied in the figures, since that would distract from the essentials of the present inventive technique. The security of a practical implementation would, however, certainly benefit when they are applied as well.

In accordance with the description in Section 11.3 of patent application Ser. No. 08/203,231, filed Feb. 28, 1994, the public key of the party controlling IC comprises numbers $g_0$, $g_1$, $g_2$, and h, all in $G_q$ and unequal to 1, and the description of a collision-resistant hash-function, $\mathcal{H}(\cdot)$. Here, $g_0$, $g_1$, and $g_2$ have been generated at random, and h is equal to $g_0^x$, where x in $Z_q$ is a randomly chosen secret key available to IC.

Figure 5:
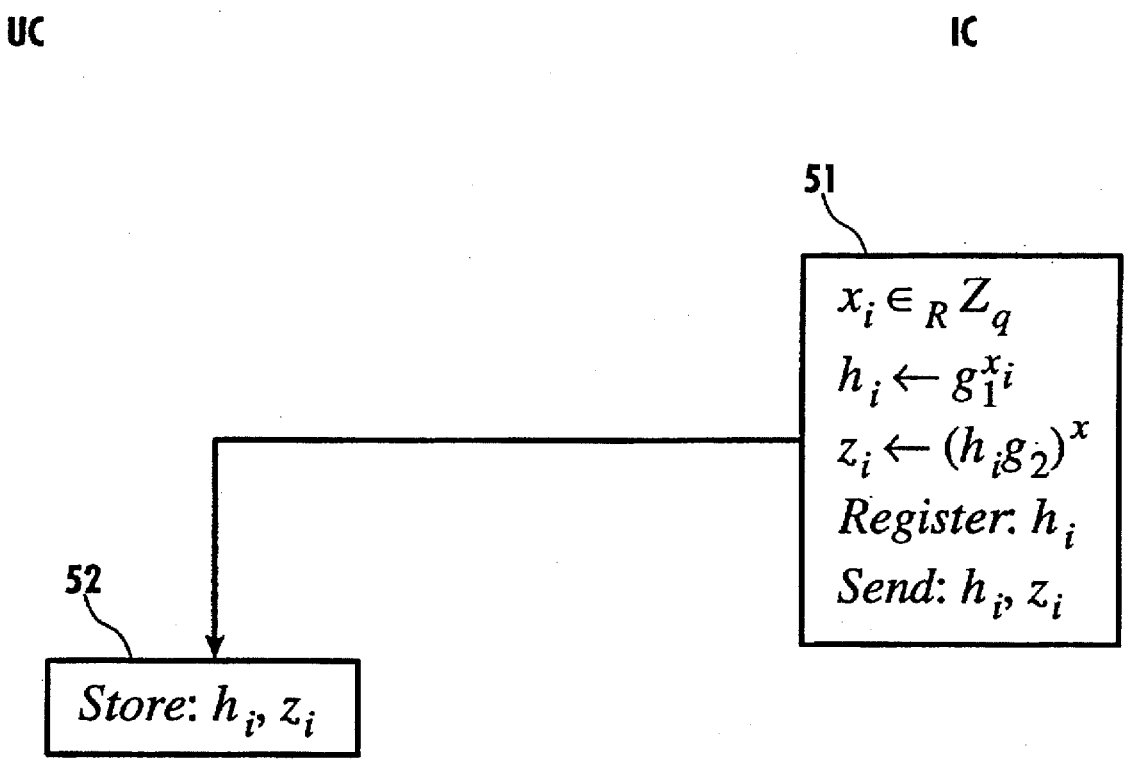
FIG. 5 shows a flowchart of an account opening protocol for a privacy-protected off-line electronic cheque system, in accordance with the teachings of the present invention.

Turning now to FIG. 5, a flowchart of an account opening protocol will now be described in detail.

The first line of Box 51 shows IC generating at random a secret key $x_i$ in $Z_q$, after having received a request from the user party holding UC to open an account. The second line shows IC computing the corresponding public key, $g_1^{x_i}$, denoted by $h_i$. The third line shows IC computing $(h_i g_2)^{z_i}$, denoted by $z_i$. The fourth line shows IC registering $h_i$. In addition (not shown in the figure) IC registers a balance variable, bal, that keeps track of the amount of cash that the party holding UC has in its account. The fifth line shows IC sending to UC the numbers $h_i$ and $z_i$. In addition, the party controlling IC provides the user party with a tamper-resistant device, TC, that has stored in its non-volatile memory at least the numbers $x_i$ and $g_1$, a description of $G_q$, code to perform its role in the protocols, and a counter variable denoted by balance. The counter variable serves to keep track of the amount of electronic cash that is held by the user party, and the number $h_i$ is the public key of TC. To ensure that TC cannot leak privacy-related information to the outside world, the user party configures TC and UC in such a way that all flow of information between TC and the outside world passes through UC.

Box 52 shows UC storing $h_i$ and $z_i$. These numbers will be needed to withdraw an electronic cheque.

Figure 6:
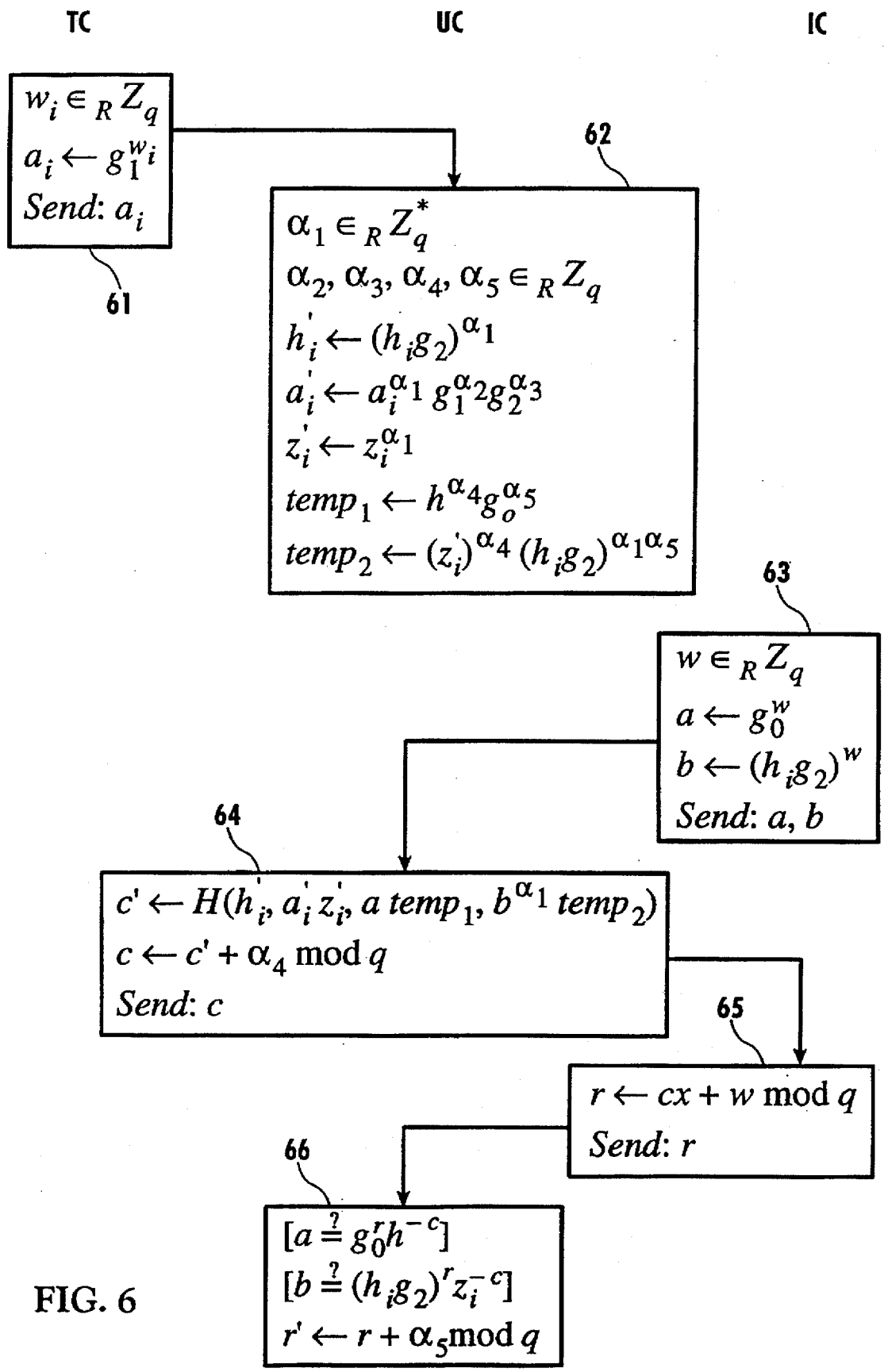
FIG. 6 shows a flowchart of a cheque withdrawal protocol for the privacy-protected off-line electronic cheque system, in accordance with the teachings of the present invention.

Turning now to FIG. 6, a flowchart of a cheque withdrawal protocol will now be described in detail.

In this protocol the account of the user party holding UC and TC, henceforth referred to as the account holder, will not be charged by IC; cheques can be withdrawn for free (or perhaps for a small fee). Instead, the transfer of cash from the account to the tamper-resistant computing device, TC, takes place by a separate cash withdrawal protocol, described by FIG. 9 below. An alternative approach would be for IC to charge the account of the account holder for the maximum amount, denoted by max, for which a withdrawn cheque can be spent. With the latter approach, the counter in TC, balance, serves to accumulate the unspent parts of electronic cheques, and the account holder should be able to deposit accumulated value to its account. Although this approach offers somewhat greater security for the bank against a criminal who manages to extract the contents of TC, the first approach is more convenient for the account holder, and so will for explicitness be assumed in the following description.

The first line of Box 61 shows TC generating at random a number $w_i$ in $Z_q$; this number must be stored for later use, in the payment protocol. The second line shows TC computing $a_i$ according to $g_1^{w_i}$. As shown in the third line, TC then sends $a_i$ to UC.

The first line of Box 62 shows UC generating at random a number in $Z^*_q$. The second line shows UC generating at random four numbers, all in $Z_q$. The third and fourth lines show UC computing two numbers, $h_i'$ and $a_i'$, where $h_i'$ is a blinded form of $h_i g_2$; $(h_i', a_i')$ is a one-time public key that is hidden from IC. The fifth line shows UC computing $z_i'$, by blinding $z_i$. The sixth and seventh lines show UC pre-computing two numbers, $\text{temp}_1$ and $\text{temp}_2$, for use in Box 64. UC stores $(h_i', a_i')$ and $(\alpha_1, \alpha_2, \alpha_3)$ for later use in the payment protocol, and temporarily stores $\text{temp}_1$ $\text{temp}_2$, $\alpha_4$, and $\alpha_5$.

These steps conclude the pre-processing phase of the protocol. UC now makes a connection with IC, requesting the withdrawal of a cheque. For security reasons, preferably an identification protocol is performed first. Hereto TC can prove knowledge of $x_i$ without revealing it, for example by using the Schnorr identification protocol. Alternatively, an identification protocol based on conventional cryptographic techniques can be used, similar to FIG. 9, to be described. After successful identification, the cheque withdrawal protocol continues.

The first line of Box 63 shows IC generating at random a number w in $Z_q$. The second and third lines show IC computing two numbers, a and b. As shown in the fourth line, IC then sends a and b to UC.

The first line of Box 64 shows UC computing a member c', which UC stores for later use in the payment protocol. The second line shows UC computing a challenge number, c, which is a blinded form of c'. As shown by the fourth line, UC then sends c to IC.

The first line of Box 65 shows IC computing a response number, r, based on its secret key x. The second line shows IC sending r to UC. This concludes the on-line part of the protocol; UC can now go off-line again.

The first two lines of Box 66 show UC verifying r, by checking two relations. For greater efficiency, the verification can be omitted, or performed only occasionally. Alternatively, it can be performed somewhat more efficiently, after r' has been computed as specified in the third line, to be described, by verifying whether $(g_0 h_i')^{-r'}(h z_i')^{c'} a'b'$ is equal to 1. As shown by the third line, if the verification holds then UC computes r', which is a blinded form of $r_1$, and stores it for use in the payment protocol. The numbers $temp_1$ $temp_2$, $\alpha_4$, and $\alpha_5$ can be erased, since they are no longer needed.

Figure 7:
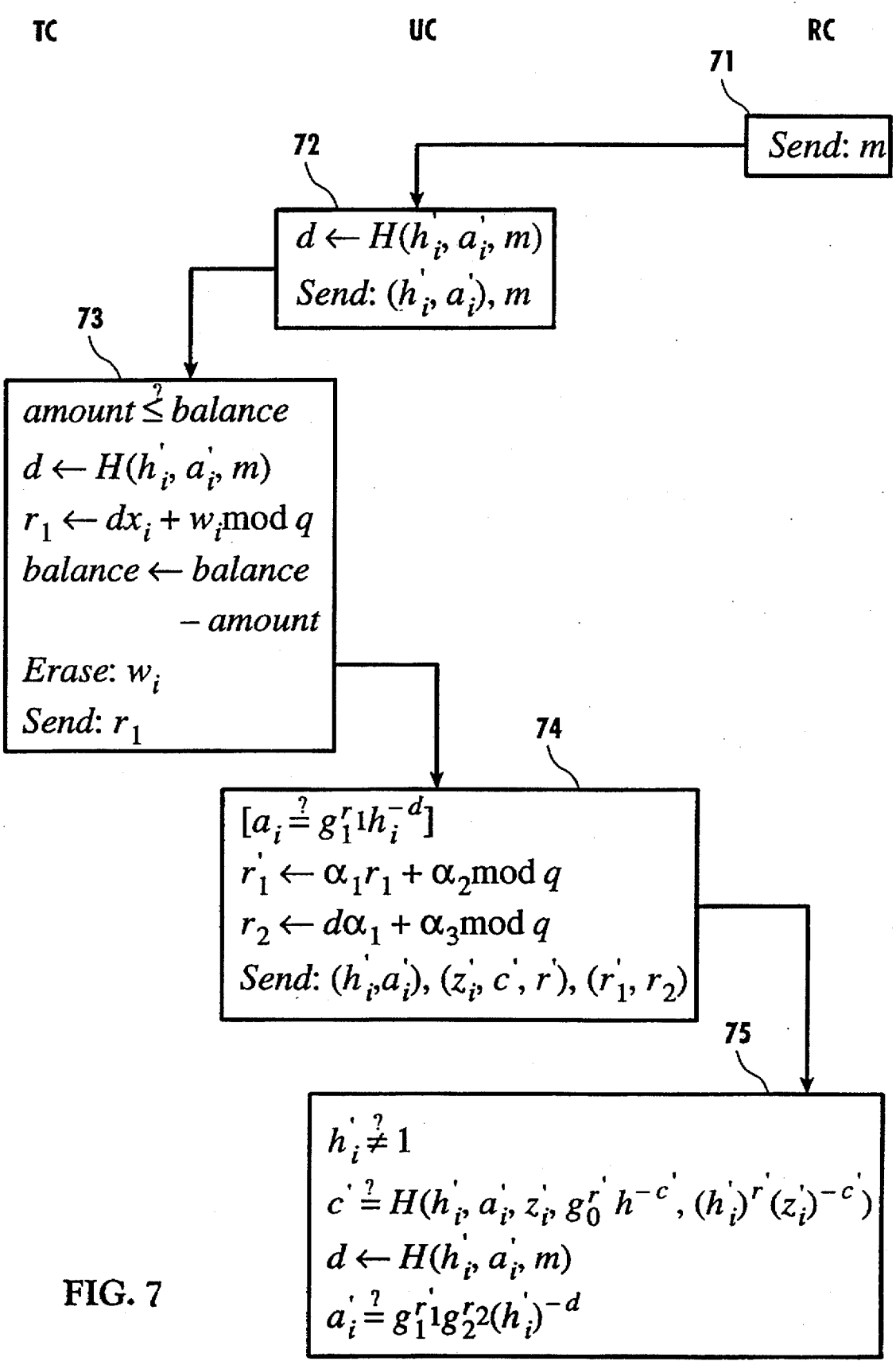
FIG. 7 shows a flowchart of a cheque payment protocol for the privacy-protected off-line electronic cheque system, in accordance with the teachings of the present invention.

As already indicated, an important benefit comes from applying the inventive technique described by FIG. 2 to the cheque withdrawal protocol, which those of ordinary skill in the art should find a straightforward task. The computation in Box 61 of $a_i$ is hereto simulated using pseudo-random numbers, and is performed by IC instead of TC, and synchronization of the pre-processed numbers provided by IC and those expected by TC in the cheque payment protocol, to be described in FIG. 7, is ensured exactly as in FIG. 2. Since the cheque payment protocol and the cash withdrawal protocol, to be described by FIG. 9, also do not require TC to perform heavy cryptographic operations, this means that the entire cash system can be implemented using tamper-resistant computing devices with non-sophisticated processors, while maintaining a high performance level.

Turning now to FIG. 7, a flowchart of a cheque payment protocol will now be described in detail.

Box 71 shows RC, having received from the account holder a request to provide a "service," sending to UC a message, m. This message is a concatenation, in a standardized format, of the amount that is to be transferred, denoted by amount, the time and date of the transaction, and an identification number. The identification number is uniquely associated, at least by the party controlling IC, with RC, such as its account member at IC or its public key. Additional data fields may be included in m. It is assumed without loss of generality that amount is no greater than max; amounts in excess of max must be paid by using more than one cheque.

The first line of Box 72 shows UC computing a number d according to $\mathcal{H}(h_i',a_i', m)$. The second line shows UC sending its one-time public key, $(h_i',a_i')$, and the message, m, to TC.

The first line of Box 73 shows TC verifying that balance is no less than amount. If this is the case then, as shown by the second line, TC computes d as did UC. The third lane shows TC computing a response number $r_1$, based on its secret key $x_i$. The fourth line shows TC decreasing balance by amount. The fifth line shows TC erasing we from its memory. Finally, as shown in the sixth line, TC sends $r_1$ to UC.

As will be clear, If cheques in the cheque withdrawal protocol must be pre-paid for the maximum amount, then the second line must be omitted, and in the fourth line balance must be increased by max minus amount.

The first line of Box 74 shows UC verifying the correctness of $r_1$. This step can be omitted, or performed only occasionally. As shown in the second line, if the verification holds then UC computes $r_1'$, which is a blinded form of $r_1$. The third line shows UC computing a second response member, $r_2$. Finally, as shown in the fourth line, UC sends to RC the one-time public key, the digital certificate of IC, and the digital signature with respect to the one-time public key.

The first two lines of Box 75 show RC verifying the one-time public key and the digital certificate. Then, as shown in the third and fourth lines, RC verifies the signature on the message, m. If both verifications hold, RC is ensured that the payment can later on be deposited with IC, and can provide the requested service to the account holder.

In some applications it is conceivable that UC can determine m itself. For example, when payments are made over a computer network, date and time may be retrieved locally, and the identification number of RC may be stored on a local server. Since it can be expected that the granularity of the time field in m is such that small disturbances in clock synchronization between UC and RC result in different values, it is conceivable that RC expects another time field value to have been used by UC. This need not be a problem, when the following technique is used. During the payment, UC sends the chosen value for the time field along. RC then checks that the same cheque has not already been used for the same time value. To this end, RC can accept any suggested value for the time field that lies within a certain time span, such as half an hour, and for each payment verify that the involved payment data has not been received before in this time span.

Figure 8:
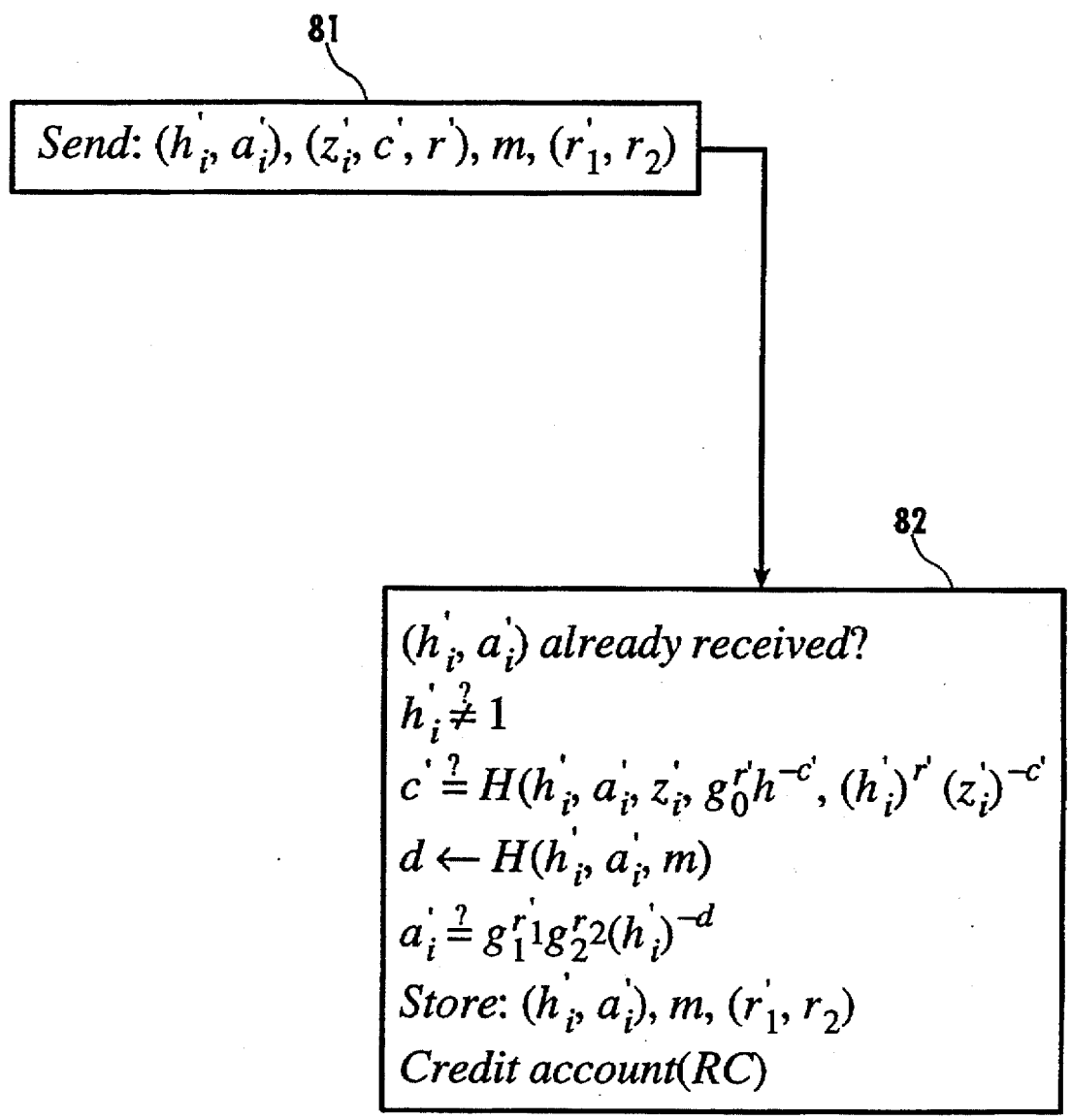
FIG. 8 shows a flowchart of a cheque deposit protocol for the privacy-protected off-line electronic cheque system, in accordance with the teachings of the present invention.

Turning now to FIG. 8, a flowchart of a cheque deposit protocol will now be described in detail.

Box 81 shows RC sending the written cheque to IC.

The first line of 82 shows IC searching a deposit database to find out if $(h_i',a_i')$ has already been received. As shown in the next three lines, if this is not the case then IC verifies the cheque. More specifically, the second line shows IC verifying the one-time public key; the third line shows IC verifying the digital certificate of IC; and the fourth and fifth lines show IC verifying the digital signature on m. As shown in the sixth line, If the verifications hold then IC stores $(h_i',a_i')$, m and $(r_1',r_2)$ in its deposit database. Finally, as shown in the seventh fine, IC then credits the account of the account holder that is associated with the identification number specified in m, by the amount, amount, that is specified in m.

In case $(h_i',a_i')$ in the first line of Box 82 is found to be already in the deposit database, a fraud has occurred. If the message of the already stored information is identical to the message, m, of the new payment, then the cheque has already been deposited and is not accepted by IC. (Note that the inclusion of the identification number in m prevents wire-tappers from depositing cheques, transferred to RC, to an account other than that of RC.) Otherwise, IC verifies the deposited cheque as in Box 82. If the verifications hold then the cheque must have been double-spent (implying that some party has been able to extract the secret key of a tamper-resistant computing device). From the pair, $(r_1',r_2)$, and the pair for the already deposited cheque, say $(r_1'',r_2')$ IC can compute $(r_1'-r_1')/(r_2-r_2') \bmod q$, which is equal to the public key $h_i$ of the tamper-resistant device that must have been compromised.

As will be appreciated, this property of traceability of double-spent cheques ensures that if the account holder manages to extract the contents of TC, it cannot spend the same withdrawn cheques over and over without being traceable. Untraceable electronic cash can be introduced only by spending each withdrawn cheque once; in that way a profit of at most the number of withdrawn cheques times their maximum spendable amount can be made. Since IC can monitor the number of cheques withdrawn from an account, the expected financial damage due to compromise of tamper-resistant devices is greatly limited. By applying, in addition, the inventive techniques of FIGS. 3 and 4 to the computing devices of account holders, security is also offered against criminals who try to make a profit by using stolen computing devices. Of course, account holders should be required to report the loss or theft of stolen computing devices, in order to prevent (partial) liability, and blacklisting can be applied.

Several optimizations to the protocols described by the flowcharts of FIGS. 6 to 8 can be applied. If the number d in the cheque payment and cheque deposit protocols is computed, by all parties involved, according to $\mathcal{H}(h_i', \mathcal{H}(a_i'), \text{spec})$, and the verification relation $a_i'^2 g_1^{r_1} g_2^{r_2} (h_i')^{-d}$ is replaced by $\mathcal{H}(a_i') \stackrel{?}{=} \mathcal{H}(g_1^{r_1} g_2^{r_2} (h_i')^{-d})$, then $\mathcal{H}(a_i)$ can be sent instead of $a_i$. Similarly, the number $z_i'$ can be hashed. A further reduction can be obtained by merging the verification relations for $a_i'$ and $c'$ into $$c' = \mathcal{H}(h_i', g_1^{r_1} g_2^{r_2} (h_i')^{-d} \mathcal{H}(z_i'), g_0^{r} h^{-c'}, (h_i')^{r'}(z_i')^{-c'}).$$

In that case, $a_i'$ need not be transferred in the payment and deposit protocols, and need not be stored by UC in the cheque withdrawal protocol. In the deposit protocol, IC then uses comparison to $h_i'$, instead of to $(h_i', a_i')$. Although d can no longer be computed as $\mathcal{H}(h_i', a_i', \text{spec})$, computing it according to $\mathcal{H}(h_i', \mathcal{H}(z_i'), c', r', \text{spec})$ should not degrade security.

Furthermore, it suffices for IC to store at deposit time the information hash($h_i'$), m, ($r'_1, r_2$), and perform an occasional random check against the information in the deposit-database. Here the function hash(·) serves merely to reduce the storage space that must be reserved for $h_i'$ by IC. It need not be one-way; for example, it may simply map $h_i'$ to its twelve most significant bytes. In addition, IC may want to store m,($r'_1, r_2$), on a slow, large-capacity storage medium such as a WORM disc or tape, and store hash($h_i'$), together with a pointer to m,($r'_1, r_2$), on a fast non-volatile storage medium such as a hard disk.

By simulating its random choices using a deterministic pseudo-random number generator, UC can keep track of the produced random numbers by keeping track of indices and a seed value. This also allows UC to regenerate the random numbers, and numbers that are computed from them, at cheque payment time, instead of storing them at cheque withdrawal time. Storage space is significantly reduced in this way, which may be particularly beneficial when backup copies of withdrawn cheques are made on, say, floppy discs.

It will be clear to those of ordinary skill in the art that a variety of extensions, such as in particular those described in patent application Ser. No. 08/203,231, filed Feb. 28, 1994, can be applied. For example, protection against framing, anonymous accounts and multi-spendable cheques can be incorporated straightforwardly into the presented cheque system. Also, the tasks of TC and UC can be performed by one tamper-resistant computing device, which then must have a special-purpose cryptoprocessor; it hereto simply performs the roles of both TC and UC.

Because TC keeps track of the balance of the account holder by means of a counter, balance, and the account holder can pay an amount only when balance exceeds the amount, preferably the account holder should be able to occasionally (re)load TC, by transferring cash from its account to TC.

Figure 9:
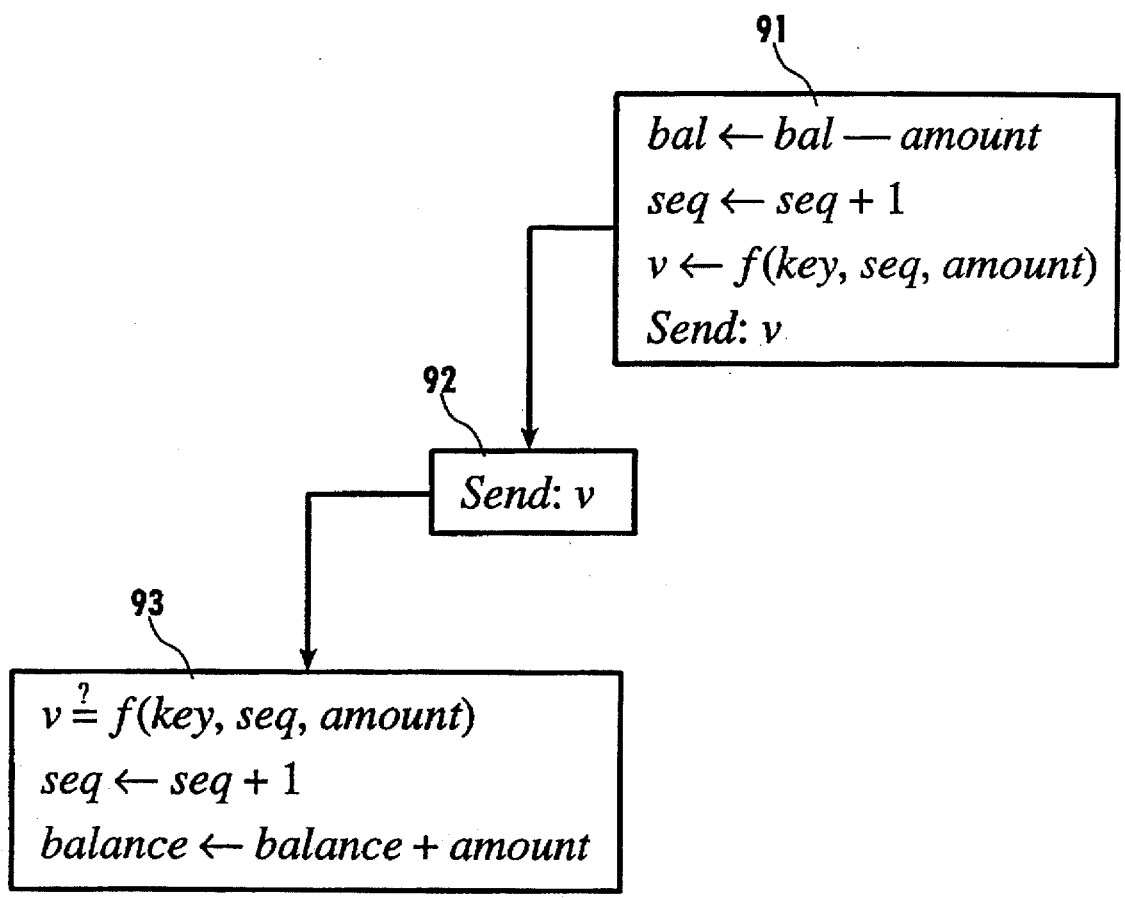
FIG. 9 shows a flowchart of a cash withdrawal protocol for the privacy-protected off-line electronic cheque system, in accordance with the teachings of the present invention.

Turning now to FIG. 9, a flowchart of a cash withdrawal protocol will now be described in detail.

TC is assumed to have in common with IC a secret key, denoted by key. This secret key, and a sequence n-tuber, seq, which has been set to some initial value, have been stored in TC before TC was issued to the account holder. The sequence number, seq, serves to prevent a replay attack by the account holder.

In addition, the description of a one-way hashfunction f(·), such as the SHA, has been stored in TC. The function f(·) may even be kept secret by the party controlling IC, for greater security. Of course, in practice f(·) may be deterministically related to $\mathcal{H}(\cdot)$, and key to $x_i$, for greater storage efficiency in TC; similar considerations as in the description of FIG. 2 apply, with seq corresponding to j, and key to x or y.

The first line of Box 91 shows IC decreasing the account balance, bal, of the account holder by amount, where amount is the cash amount that the account holder wants to transfer from its account to TC. The second line shows IC increasing seq by one. The increment by one is only for explicitness; alternatively the new sequence number is related to the old sequence number according to a more complicated relation, which may even be kept secret by IC. The third line shows IC computing v according to f(key, seq, amount). As shown in the fourth line, IC then sends v to UC. Again, the same remarks apply as in the description of FIG. 2. For instance, instead of letting IC keep track of the value of seq for TC, UC can be requested to inform IC of seq.

Box 92 shows UC passing v on to TC.

The first line of Box 93 shows TC verifying whether v is equal to f(key, seq, amount). As shown in the second line, if this is the case then TC increases seq by one. The third line shows TC increasing its counter, balance, by amount.

Although another account holder cannot transfer cash from the account of the account holder to its own tamper-resistant device, it must not be possible for other parties to decrease the account balance, bal, of the account holder. Hence the account holder should be required to prove ownership of its account before the cash withdrawal protocol is executed. Hereto a highly similar protocol, with the roles of TC and IC interchanged, can be used.

To prevent IC in this protocol from sending subliminal information to TC, UC must see to it that the number, v, transferred by IC in Box 91, cannot serve as a subliminal channel. One way to do this is as follows. Before UC passes v on to TC, TC must send to UC a commitment on f(key, seq, amount). After UC has passed v on to TC, TC must then open the commitment to reveal that it anticipated v. The commitment function can for instance be the outcome of the SHA on inputs f(key, seq, amount), in which case the commitment is opened automatically when v is revealed.

When the account holder must pre-pay withdrawn cheques for their maximum spendable amount, and the counter in TC accumulates unspent value at payment time, the above cash withdrawal protocol becomes superfluous. Instead, a highly similar protocol, with the roles of TC and IC interchanged, can be used by the account holder to deposit accumulated unspent electronic cash. It should be clear to those of ordinary skill in the art how to construct this protocol, by studying FIG. 9, and so a detailed description is omitted here.

The counter, balance, that is maintained by TC specifies an amount of electronic cash in a particular currency. For example, a counter value of 10,000 may represent 10,000 cents. To transfer an amount that is specified in a different currency than the currency used by TC, the amount is first multiplied by TC by an appropriate conversion rate, to convert it into TC's currency, before subtracting it from (or adding it to) its counter. The party controlling IC can force the use of valid conversion rates by requiring RC to specify in m a field indicating the two currencies involved in the cheque payment, and the conversion rate used for these two currencies. This field can be filled in at cheque payment time by the parties involved in the transaction. Since m also consists of time and date of the transaction, IC can verify at deposit time whether the applied conversion rate is no greater than the rate that prevailed at that time and date.

This leaves open the possibility that inappropriate time and date values, favorable to the parties involved in a transaction, are used. To prevent such fraud, deposits of receiver parties can be required to be made, say, at the end of the day, and receiver parties can be required to pay a certain fee in order to have the right to choose the most advantageous exchange rate at payment time. Alternatively, RC can be forced to use a secured processor that always generates the proper time and date. Another technique, that does not require receiver parties to use tamper-resistance, is described by FIGS. 10 to 12. These figures demonstrate the necessary changes that must be made to FIGS. 6 to 8, respectively. (The account opening protocol is the same as that described by FIG. 5.)

The public key of the party controlling IC now in addition comprises two randomly generated numbers, $g_3$ and $g_4$, both in $G_q$ and unequal to 1, and the numbers $g_3^x$ and $g_4^x$.

Figure 10:
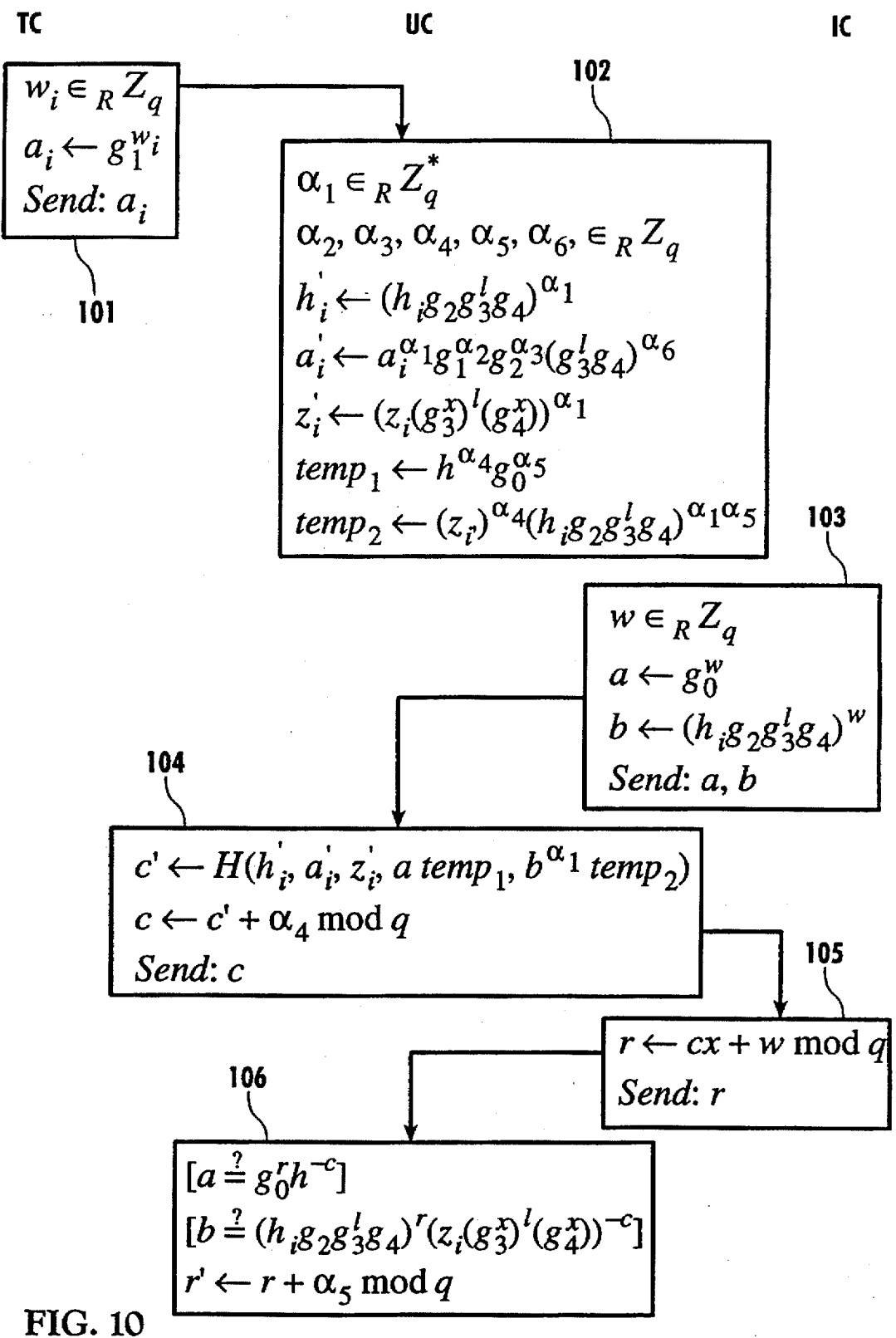
FIG. 10 shows a flowchart of a modified cheque withdrawal protocol, to allow currency conversion, in accordance with the teachings of the present invention.

Turning now to FIG. 10, a flowchart of a modified cheque withdrawal protocol will now be described in detail.

Box 101 is the same as Box 61.

The first line of Box 102 is the same as the first line of Box 62. The second line is similar to the second line of Box 62, with the addition that one extra random number, $\alpha_6$, is generated. The third line is similar to the third line of Box 62, with the difference that the computation of $h_i'$ now is also based on the product $g_3^l g_4$. Here, $l$ is a suitable encoding of a table of currency conversion rates; for all currencies that TC wants to be able to convert to at cheque payment time, the table has an entry containing an exchange rate that must be applied. Since it is infeasible to predict future conversion rates, the table should be treated much like a put option. (This may require cheques to have expiration dates; these can be encoded by IC into $l$ together with the exchange-rate table.) The fourth line is similar to the fourth line of Box 62, with the difference that $a_i'$ now is also based on $(g_3^l g_4)$ and $\alpha_6$. The fifth line is similar to the fifth line of Box 62, with the difference that $z_i'$ now is also based on $(g_3^x)^l g_4^x$; this product can be computed by UC from the two publicly available numbers $g_3^x$ and $g_4^x$, the difference being that the computation of b is now also based on $g_3^l g_4$, where $l$ is the encoding of the table of currency conversion rates. Line six is the same as the sixth line of Box 62. Finally, the seventh line is similar to the seventh line of Box 62, with the difference that the computation of $temp_2$ now is also based on the product $g_3^l g_4$.

The first line of Box 103 is the same as the first line of Box 63. The second line of Box 103 is the same as the second line of Box 63. The third line is similar to the third line of Box 63, with the difference that the computation of b now is also based on the product $g_3^l g_4$. The fourth line of Box 103 is the same as the fourth line of Box 63.

Box 104 is the same as Box 64.

Box 105 is the same as Box 65.

The first line of Box 106 is the same as the first line of Box 66. The second line is similar to the second line of Box 66, with the difference that the verification of b now is also based on the products $g_3^l g_4$ and $(g_3^x)^l g_4^x$, which can be computed from the two publicly available numbers $g_3^x$ and $g_4^x$. The third line is the same as the third line of Box 66.

As will be clear to those of ordinary skill in the art, UC can speed up computations somewhat by storing the products $z_i g_4^x$ and $h_2 g_2 g_4$ permanently.

Figure 11:
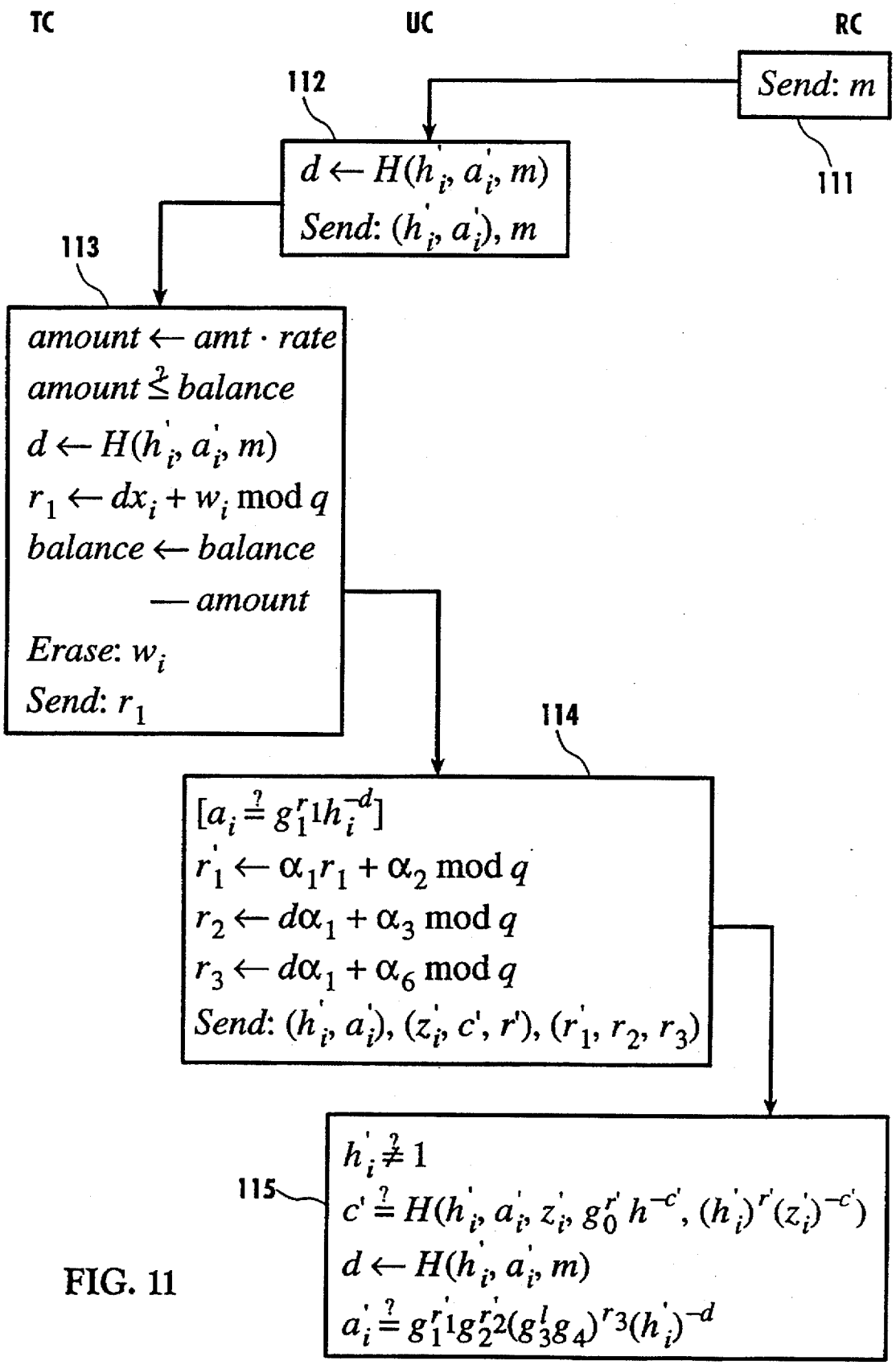
FIG. 11 shows a flowchart of a modified cheque payment protocol, to allow currency conversion, in accordance with the teachings of the present invention.

Turning now to FIG. 11, a flowchart of a modified cheque payment protocol will now be described in detail.

The first line of Box 111 shows RC determining m, the message that must be signed by the account holder. In addition to the fields specified in the description of Box 61, m now must also include a field indicating the two currencies involved in the payment, and the appropriate currency conversion rate, rate, extracted from the table specified by l. Hereto, UC will have to cooperate, by providing l to RC, since RC does not know the value of l.

Box 112 is the same as Box 72.

The first line of Box 113 is new, and shows TC converting the amount specified by RC, denoted by amt and measured in the currency used by RC, into the equivalent amount measured in the currency used by TC. TC hereto multiplies the specified amount by the appropriate conversion rate, rate, which it reads from m. To avoid cheating, TC must not accept negative values for rate. How to deal with round-off errors is a matter of IC's policy. Lines two to seven are the same as lines one to six of Box 73.

The first three lines of Box 114 are the same as the first three lines of Box 74. The fourth line is new, and shows UC computing an additional response value, $r_3$. The fifth line is similar to the fourth line of Box 74, with the difference that UC now also sends $t_3$ to RC.

The first three lines of Box 115 are the same as the first three lines of Box 75. The fourth line is similar to the fourth line of Box 76, with the difference that the verification of $a_i'$ is now also based on the currency conversion list, l, the additional response, $r_3$, and $g_3^l g_4$. If both verifications hold, then RC can provide the requested service to the account holder.

Figure 12:
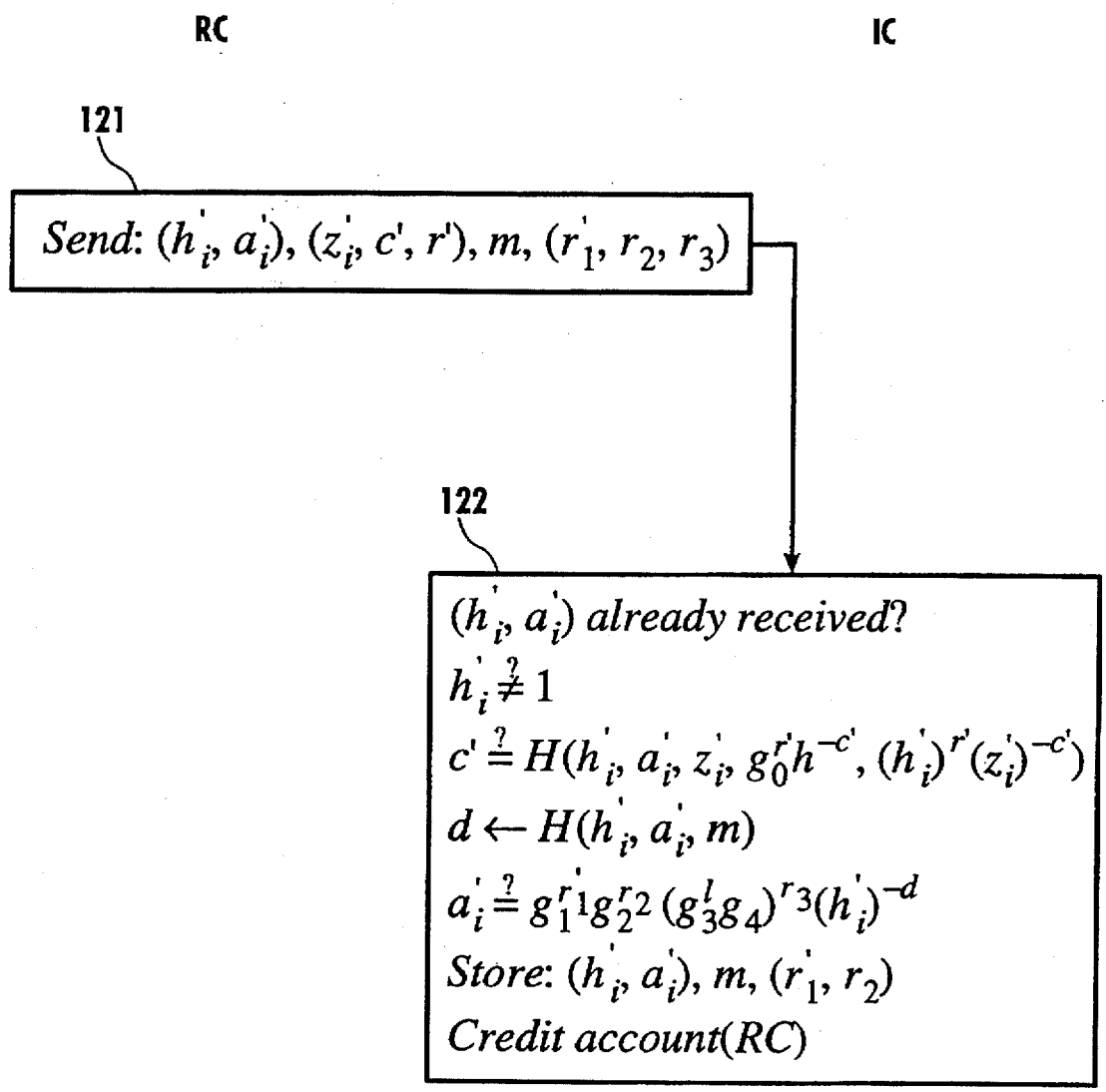
FIG. 12 shows a flowchart of a modified cheque deposit protocol, to allow currency conversion, in accordance with the teachings of the present invention.

Turning now to FIG. 12, a flowchart of a modified cheque deposit protocol will now be described in detail.

Box 121 is similar to Box 81, with the difference that RC now also sends $r_3$ to IC.

The first four lines of 122 are the same as the first four lines of Box 82. The fifth line is similar to the fifth line of Box 82, with the difference that the verification of $a_i'$ now is also based on $(g_3^l g_4)$ and $r_3$, where the value of l used by IC is that specified by m. The sixth and seventh lines are the same as the sixth and seventh lines of Box 82.

As will be appreciated, the protocols of FIGS. 10 to 12 can be further modified in order to increase efficiency. In this way the need for $g_4$, $g_4^x$, $\alpha_6$ and $r_3$ can be avoided. Hereto the blinding of $h_i g_2$ in the third line of Box 102 needs to proceed in a different way; instead of raising it to a random power, it must be multiplied by a random power of $g_0$. More specifically, the following changes must be made.

In Box 102, in the second line the generation of $\alpha_6$ must be omitted. The third line must be changed to read $h_i' \leftarrow h_i g_2 g_3^l g_0^{\alpha_1}$. The fourth line must be changed to read $a_i' \leftarrow a_i g_1^{\alpha_2} g_0^{\alpha_3}$. The fifth line must be changed to read $z_i' \leftarrow z_i (g_3^x)^l h^{\alpha_1}$. Finally, the seventh line must be changed to read $temp_2 \leftarrow g_0^{\alpha_1 \alpha_5} (h_i g_2 g_3^l)^{\alpha_5} (z_i')^{\alpha_4}$.

In Box 103, the third line must be changed to read $b \leftarrow (h_i g_2 g_3^l)^w$.

In Box 104, the first line must be changed to read $c' \leftarrow \mathcal{H}(h_i',a_i',z_i',a \text{ temp}_1, b \text{ a}^{\alpha_1} \text{temp}_2)$.

In Box 106, the second line must be changed to read $[b \underline{?}(h_i g_2 g_3^I)^r (z_i(g_3^x)^I)^{-c}]$.

In Box 114, the second line must be changed to read $r_1' \leftarrow r_1 + \alpha_2 \mod q$. The fourth line must be omitted, and in the fifth line $r_3$ must be omitted.

In Box 115, the fourth line must be changed to read $a_i' \underline{?} g_1^{r_1} g_0^{r_2} (h_i'/(g_2 g_3^I))^{-d}$.

In Box 121, in the first line $r_3$ must be omitted.

Finally, in Box 122, the fifth line must be changed to read $a_i' \underline{?} g_1^{r_1} g_0^{r_2}(h_i'/(g_2 g_3^I))^{-d}$, and in the sixth line storage of $r_2$ can be omitted.

This concludes the detailed descriptions of two preferred embodiments. While these descriptions of the present invention have been given as examples, it will be appreciated by those of ordinary skill in the art that various modifications, alternate configurations, and equivalents may be employed without departing from the spirit and scope of the present invention. For example, there are many essentially equivalent orders to evaluate expressions; ways to evaluate expressions; ways to order expressions, tests, and transmissions within flowchart boxes; ways to group operations into flowchart boxes; and ways to order flowchart boxes. The particular choices that have been made here are merely for clarity in exposition. Various such modifications, alternate configurations, and equivalents have been indicated in the text.

Certain variations and substitutions may be apparent to those of ordinary skill in the art. Various such variations and substitutions have been indicated and sometimes described in detail in the text.

It will also be obvious to those of ordinary skill in the art how parts of the inventive techniques and protocols disclosed here can be used to advantage.

What is claimed is:

1. A method for a tamper-resistant first computing device to perform a cryptographic action with respect to a public key, the first computing device being held by a party that also holds a user-controlled second computing device, the method comprising the steps of:

computing by the second computing device, at least one number based on at least a first secret key held by the second computing device, the at least one number being substantially uncorrelated to the first secret key;

providing by the second computing device to the first computing device, the at least one number; and computing by the first computing device, at least one output based on at least the at least one number and a second secret key held by the first computing device, a function of the first and second secret keys being equal to a third secret key corresponding to the public key.

2. A method as in claim 1, wherein the cryptographic action is digital signing.

3. A method as in claim 2, wherein the digital signing is based on a digital signature scheme of the Fiat-Shamir type.

4. A method for a tamper-resistant first computing device to perform a cryptographic action based on a first secret key, the first computing device being held by a party also holding a user-controlled second computing device, the method comprising the steps of:

providing by the second computing device to the first computing device, a second secret key;

computing by the first computing device, at least one output based on at least the second secret key and a third secret key, the first secret key being a function of the second and third secret keys; and erasing by the first computing device, the second secret key.

* * * * *